(12) United States Patent
Tsukahara et al.

(10) Patent No.: US 8,896,523 B2
(45) Date of Patent: Nov. 25, 2014

(54) INFORMATION PROCESSING APPARATUS, INFORMATION PROCESSING METHOD, AND INPUT APPARATUS

(75) Inventors: Tsubasa Tsukahara, Tokyo (JP); Masatoshi Ueno, Kanagawa (JP); Kenichi Kabasawa, Saitama (JP); Shinobu Kuriya, Kanagawa (JP); Tetsuro Goto, Tokyo (JP); Toshiyuki Nakagawa, Kanagawa (JP)

(73) Assignee: Sony Corporation, Tokyo (JP)

(*) Notice: Subject to any disclaimer, the term of this patent is extended or adjusted under 35 U.S.C. 154(b) by 210 days.

(21) Appl. No.: 13/549,163

(22) Filed: Jul. 13, 2012

(65) Prior Publication Data

US 2013/0027299 A1 Jan. 31, 2013

(30) Foreign Application Priority Data

Jul. 25, 2011 (JP) ................................. 2011-161797

(51) Int. Cl.
| | | |
|---|---|---|
| *G09G 5/00* | (2006.01) | |
| *G06F 3/0484* | (2013.01) | |
| *G06F 1/16* | (2006.01) | |
| *G06F 3/0354* | (2013.01) | |
| *G06F 3/0481* | (2013.01) | |
| *G06F 3/0346* | (2013.01) | |

(52) U.S. Cl.
CPC ............ *G06F 1/1694* (2013.01); *G06F 3/0484* (2013.01); *G06F 2203/0384* (2013.01); *G06F 3/0354* (2013.01); *G06F 3/04815* (2013.01); *G06F 3/0346* (2013.01)
USPC ........................... 345/156; 345/157; 345/163

(58) Field of Classification Search
USPC .................................................. 345/156–169
See application file for complete search history.

(56) References Cited

U.S. PATENT DOCUMENTS

| | | | |
|---|---|---|---|
| 6,466,831 B1* | 10/2002 | Shibata et al. .................. | 700/85 |
| 8,199,107 B2* | 6/2012 | Xu et al. ........................ | 345/158 |
| 2003/0107551 A1* | 6/2003 | Dunker .......................... | 345/158 |

FOREIGN PATENT DOCUMENTS

| | | |
|---|---|---|
| JP | 06-501119 A | 2/1994 |
| WO | WO 92-06465 A1 | 4/1992 |

\* cited by examiner

*Primary Examiner* — Jennifer Nguyen
(74) *Attorney, Agent, or Firm* — Wolf, Greenfield & Sacks, P.C.

(57) ABSTRACT

An information processing apparatus includes a calculation unit and a determination unit. The calculation unit has a two-dimensional calculation mode configured to perform, when an operation device is placed on an operation surface and a user operates the operation device, calculation based on a detection value of a motion sensor corresponding to two-dimensional motion of the operation device, and has a three-dimensional calculation mode configured to perform, when the user operates the operation device in a three-dimensional space, calculation based on a detection value of the motion sensor corresponding to three-dimensional motion of the operation device. The determination unit is configured to determine which of the two-dimensional calculation mode and the three-dimensional calculation mode is used to perform the calculation with the calculation unit, based on the detection value of the motion sensor and at least one of information other than the detection value of the motion sensor.

15 Claims, 17 Drawing Sheets

INFORMATION PROCESSING APPARATUS, INFORMATION PROCESSING METHOD, AND INPUT APPARATUS

BACKGROUND

The present disclosure relates to an input apparatus including an operation device having a sensor for use in detecting motion and also relates to an information processing apparatus and an information processing method that process information obtained by the sensor.

In recent years, a variety of space operation (three-dimensional operation) type operation apparatuses or input apparatuses have been proposed. For example, an input apparatus described in Japanese Unexamined Patent Application Publication No. Hei 6-501119 detects the motion of a six-dimensional mouse in a three-dimensional space. More specifically, the input apparatus includes an accelerometer that detects acceleration along three orthogonal axes and a rotational speed sensor that detects rotational speeds about the three orthogonal axes. A system including the input apparatus determines its position, posture, or the like based on the obtained acceleration and rotational speeds, and a computer such as a display apparatus causes a GUI (Graphical User Interface) to realize motion according to the motion of the input apparatus (see, for example, Japanese Unexamined Patent Application Publication No. Hei 6-501119).

SUMMARY

Meanwhile, there is a case that a two-dimensional operation type input apparatus is used to operate a two-dimensionally-displayed operation object and a three-dimensional operation type input apparatus is used to operate a three-dimensionally-displayed operation object. In this case, it is necessary for the user to use the separate input apparatuses, which results in the operations being complicated.

The present disclosure has been made in view of the above circumstances, and it is therefore desirable to provide an information processing apparatus and an information processing method that allow the user to easily perform both a two-dimensional operation and a three-dimensional operation.

Further, it is desirable to provide an input apparatus useful when the user performs both a two-dimensional operation and a three-dimensional operation.

According to an embodiment of the present disclosure, there is provided an information processing apparatus for processing information obtained from an operation device having a motion sensor capable of detecting translating and rotating motion of the operation device, the information processing apparatus including a calculation unit and a determination unit.

The calculation unit has a two-dimensional calculation mode and a three-dimensional calculation mode. The two-dimensional calculation mode is configured to perform, when the operation device is placed on an operation surface and a user operates the operation device, calculation based on a detection value of the motion sensor corresponding to two-dimensional motion of the operation device. The three-dimensional calculation mode is configured to perform, when the user operates the operation device in a three-dimensional space, calculation based on a detection value of the motion sensor corresponding to three-dimensional motion of the operation device.

The determination unit is configured to determine which of the two-dimensional calculation mode and the three-dimensional calculation mode is used to perform the calculation with the calculation unit, based on the detection value of the motion sensor and at least one of information other than the detection value of the motion sensor.

Because the information processing apparatus includes the determination unit configured to determine which of the two-dimensional calculation mode and the three-dimensional calculation mode is used to perform the calculation, it is possible for the information processing apparatus to support both the two-dimensional operation and the three-dimensional operation of the user. Accordingly, the user is allowed to easily perform both the two-dimensional operation and the three-dimensional operation without using separate input apparatuses.

The calculation unit may be configured to perform the calculation, using, as the two-dimensional calculation mode, a calculation mode when the user operates the operation device with a curved outer surface of the operation device coming in contact with the operation surface.

The operation device may have a front surface including the outer surface and a pressure sensor configured to detect a force applied to the front surface, and the determination unit may be configured to acquire a detection value of the pressure sensor as the other information.

The determination unit may be configured to determine that the calculation unit performs the calculation under the two-dimensional calculation mode when the pressure sensor detects an application of a force greater than or equal to a pressure force by the operation device to the front surface. Further, the determination unit may be configured to determine that the calculation unit performs the calculation under the three-dimensional calculation mode when the pressure sensor does not detect the application of the force greater than or equal to the pressure force by the operation device to the front surface. When the operation device is placed on the operation surface, the user puts his/her hand on the operation device and the pressure sensor detects the application of a force greater than or equal to the weight of the operation device to the front surface. In this case, the calculation unit performs the calculation under the two-dimensional calculation mode. On the other hand, when the user holds the operation device and removes the same from the front surface, the pressure sensor detects the application of a force less than the weight of the operation device to the front surface. In this case, the calculation unit performs the calculation under the three-dimensional calculation mode.

The determination unit may be configured to determine that the calculation unit performs the calculation under the three-dimensional calculation mode when the detection value of the motion sensor includes a hand shake component of the user. Further, the determination unit may be configured to determine that the calculation unit performs the calculation under the two-dimensional calculation mode when the detection value of the motion sensor does not include the hand shake component of the user. When the user holds the operation device in the three-dimensional space, the detection value of the motion sensor includes the hand shake component of the user. In this case, the calculation unit performs the calculation under the three-dimensional calculation mode.

The present disclosure is also applicable to a magnetic sensor as described below.

The determination unit may be configured to acquire, as the other information, a detection value of one of a capacitance sensor, an air pressure sensor, an optical sensor, an ultrasonic sensor, and a distortion sensor.

The determination unit may be configured to acquire, as the other information, a detection value of a sensor provided in a stage including the operation surface having a shape corresponding to the outer surface of the operation device.

The information processing apparatus may further include a storage unit configured to store application software for switching between the two-dimensional calculation mode and the three-dimensional calculation mode depending on an input operation of the user. Thus, it is possible for the information processing apparatus to reliably switch between the calculation modes according to the intention of the user.

The operation device may be an operation device including an acceleration sensor, an angular speed sensor, and a magnetic sensor each having three orthogonal detection axes in a local coordinate system and capable of being operated by the user in any position in the three-dimensional space.

In this case, the calculation unit may have an acquisition unit, a coordinate conversion unit, an initial posture angle calculation unit, an update unit, and a control unit.

The acquisition unit is configured to acquire information on acceleration, angular speeds, and magnetic intensity detected by the acceleration sensor, the angular speed sensor, and the magnetic sensor, respectively.

The coordinate conversion unit is configured to convert, using information on posture angles of the operation device in a global coordinate system representing the three-dimensional space, the angular speeds acquired by the acquisition unit into global angular speeds in the global coordinate system.

The initial posture angle calculation unit is configured to calculate initial posture angles of the operation device in the global coordinate system as the posture angles based on the information on the acceleration and the magnetic intensity acquired by the acquisition unit when the user starts operating the operation device.

The update unit is configured to update the posture angles of the operation device in the global coordinate system based on information on the global angular speeds converted by the coordinate conversion unit.

The control unit is configured to cause the coordinate conversion unit to convert, using information on the initial posture angles calculated by the initial posture angle calculation unit, first angular speeds as the angular speeds acquired by the acquisition unit when the user starts operating the operation device into the global angular speeds. Further, the control unit is configured to cause the coordinate conversion unit to convert, using information on the updated posture angles, second angular speeds acquired after the first angular speeds into the global angular speeds.

Thus, it is possible to make the information on the global angular speeds converted and obtained by the coordinate conversion unit correspond to the motion of an operation object by the operation device or to the change of the image of the operation object.

The calculation unit may be configured to implement the three-dimensional calculation mode in such a manner that the coordinate conversion unit converts the acceleration acquired by the acquisition unit into global acceleration in the global coordinate system based on the information on the posture angles of the operation device updated by the update unit. Thus, it is possible to make the information on the global acceleration corresponding to particularly the translating motion of the operation device in the three-dimensional space correspond to the motion of an operation object or to the change of the image of the operation object.

The operation device may be spherical in outer shape.

The calculation unit may be configured to generate, in the two-dimensional calculation mode, information for moving a first operation object image on a screen according to the motion of the operation device, the first operation object image being displayed on the screen. Further, the calculation unit may be configured to generate, in the three-dimensional calculation mode, information for moving a second operation object image on the screen according to the motion of the operation device, the second operation object image being displayed on the screen and different from the first operation object image. Thus, the user is allowed to operate the first operation object image suitable for the two-dimensional operation and the second operation object image suitable for the three-dimensional operation. Examples of the first operation object image and the second operation object image include the following images.

The calculation unit may be configured to generate, in the three-dimensional calculation mode, the information for moving the second operation object image, the second operation object image being a three-dimensional image formed by a plurality of images including parallax.

The information processing apparatus may further include an image storage unit configured to store the second operation object image as an image associated with a predetermined coordinate position on the screen of the first operation object image.

The calculation unit may be configured to generate, in the two-dimensional calculation mode, a pointer image for selecting an image to be displayed on the screen according to the motion of the operation device created when the user performs an input operation on the operation device. Further, the calculation unit may be configured to generate, in the three-dimensional calculation mode, information for moving the image selected by the pointer image on the screen according to the motion of the operation device.

At least one of the calculation unit and the determination unit described above may not be provided in the operation device but may be provided in a receiver for receiving an output signal from the operation device.

According to another embodiment of the present disclosure, there is provided an information processing method for processing information obtained from an operation device having a motion sensor capable of detecting translating and rotating motion of the operation device.

When the operation device is placed on an operation surface and a user operates the operation device, first calculation is performed based on a detection value of the motion sensor corresponding to two-dimensional motion of the operation device.

When the user operates the operation device in a three-dimensional space, second calculation is performed based on a detection value of the motion sensor corresponding to three-dimensional motion of the operation device.

A determination is made as to which of the first calculation and the second calculation is performed based on the detection value of the motion sensor and at least one of information other than the detection value of the motion sensor.

According to still another embodiment of the present disclosure, there is provided an input apparatus including a stage and an operation device.

The stage has an operation surface.

The operation device has an outer surface coming in contacting with the operation surface when the operation device is placed on the operation surface and a motion sensor capable of detecting translating and rotating motion of the operation device, the operation device being capable of being removed from the stage.

The user is allowed to perform the two-dimensional operation of the operation device with the outer surface of the operation device coming in contact with the operation surface of the stage. Further, it is convenient that the user is allowed to perform the three-dimensional operation of the operation device with the operation device removed from the stage.

The stage may have the operation surface formed in a shape corresponding to a shape of the outer surface of the operation device. Thus, the user is allowed to perform the two-dimensional operation of the operation device by rotating the operation device on the stage.

The stage may have a sensor capable of detecting at least translating motion of the stage. Thus, the input apparatus is allowed to use information on the detection value of the sensor provided in the stage.

The operation device may be spherical in the outer shape.

As described above, according to the present disclosure, the user is allowed to easily perform both a two-dimensional operation and a three-dimensional operation.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

(Configuration of Information Processing System)

Figure 1:
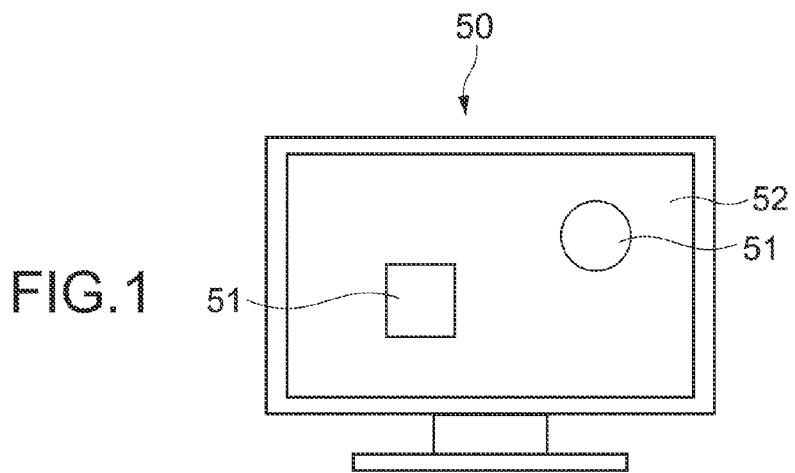
FIG. 1 is a view showing an information processing system including an information processing apparatus according to an embodiment of the present disclosure.
Figure 1:
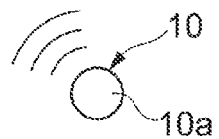

FIG. 1 is a view showing an information processing system including an information processing apparatus according to an embodiment of the present disclosure.

The information processing system 100 includes an operation device 10 operated by the user and a display device 50 that receives operation information transmitted from the operation device 10 and performs display processing based on the information. The operation device 10 and the display device 50 are electrically connected to each other. More specifically, according to this embodiment, the operation device 10 and the display device 50 are connected to each other to perform wireless communication using infrared rays, radio waves, or the like therebetween.

The operation device 10 is formed in a size that allows a person to hold it with his/her hand. The operation device 10 has a front surface (entire front surface of a sphere) including a curved outer surface 10a and is typically spherical in shape. As described below, the user performs a two-dimensional operation with the front surface of the operation device 10 coming into contact with an operation surface 30 (see FIG. 6). The operation surface 30 may be a floor surface, a table surface, a desk surface, or the like. Alternatively, the operation surface 30 may be part of a user's body such as the thigh of the user.

The display device 50 generates, when the user operates the operation device 10, a display image for changing the image of an object (operation object image) 51 in the screen of a display unit 52 and also controls the display of the display image. For example, examples of changing the image may include anything such as movement (including at least one of rotation and translation) of the operation object, change of the shape, pattern, color, or the like of the operation object, and an increase in the number of the operation objects. When the user operates the operation device 10, the display device 50 changes the object 51 according to the motion of the operation device 10.

Typical examples of the display device 50 include an apparatus such as a 3D (three-dimensional) TV capable of displaying the three-dimensional object 51. The operation object is not limited to a 3D image but may include a 2D (two-dimensional) image such as an icon and a pointer. Each of the icon and the pointer may be displayed as a 3D image.

Figure 2:
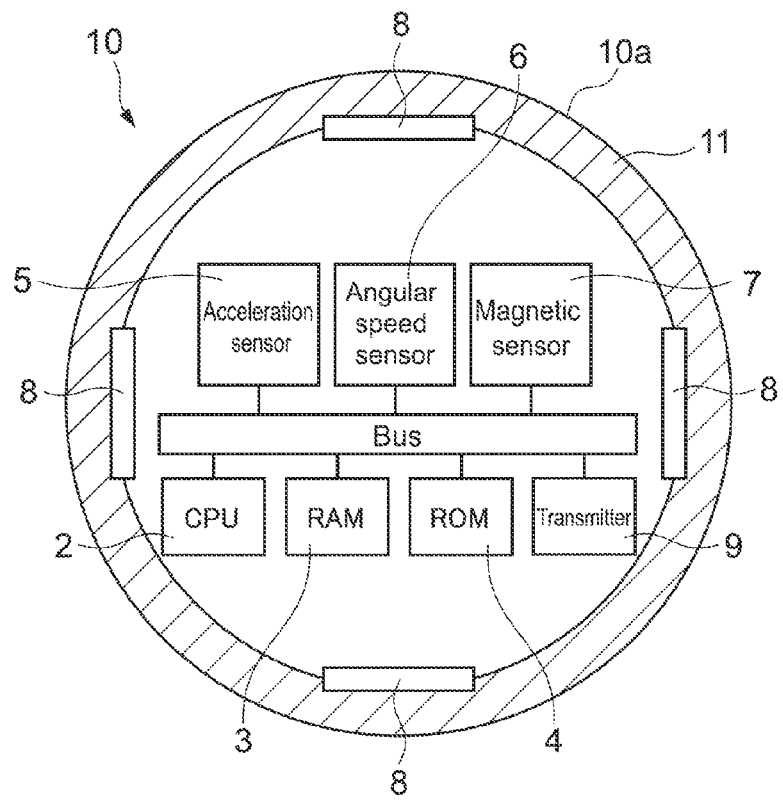
FIG. 2 is a diagram showing the configuration of the hardware of an operation device.

FIG. 2 is a diagram showing the configuration of the hardware of the operation device 10. The operation device 10 includes a CPU (Central Processing Unit) 2, a RAM (Random Access Memory) 3, a ROM (Read-Only Memory) 4, and a transmitter 9. In addition, the operation device 10 includes three types of sensors as motion sensors, i.e., an acceleration sensor 5, an angular speed sensor 6, and a magnetic sensor 7. Moreover, the operation device 10 includes pressure sensors 8, a power supply (not shown), a rewritable memory (not shown), and the like. Instead of the CPU 2, programmable hardware such as a FPGA (Field Programmable Gate Array) may be used. As the angular speed sensor 6, a device is used that detects an angular speed itself using, for example, a Coriolis force.

These hardware is arranged inside a spherical housing 11 to be fixed thereto. The plurality of pressure sensors 8 are attached on, for example, the side of the inner surface of the housing 11 and detect the pressure position and the pressure force of the user as a pressure sensor group. The pressure sensors 8 are arranged near the front surface of the operation device 10 to be uniformly dispersed.

Figure 3:
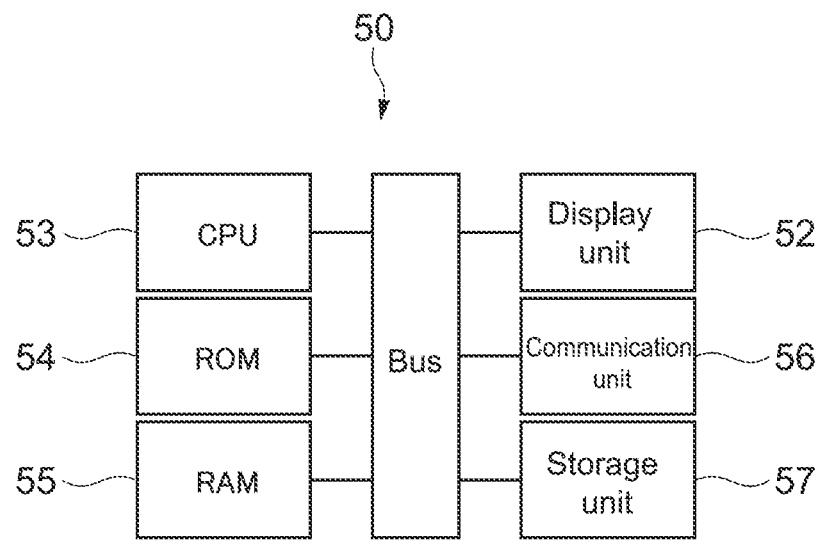
FIG. 3 is a diagram showing the configuration of the hardware of a display device.

FIG. 3 is a diagram showing the configuration of the hardware of the display device 50. The display device 50 includes, as with a general computer, a CPU 53, a ROM 54, and a RAM 55, and also includes the display unit 52, a communication unit 56, and a storage unit 57. Here, the communication unit 56 mainly serves as a receiver. The storage unit 57 is typically an auxiliary (secondary) storage unit for the ROM 54 and the RAM 55.

Note that the display device 50 has such a configuration that a control part for receiving information transmitted from the operation device 10 and controlling the display of the object 51 is integrated with the display unit 52. However, the control part and the display unit 52 may be separate bodies and connected to each other to perform wired or wireless communication therebetween.

Figure 4:
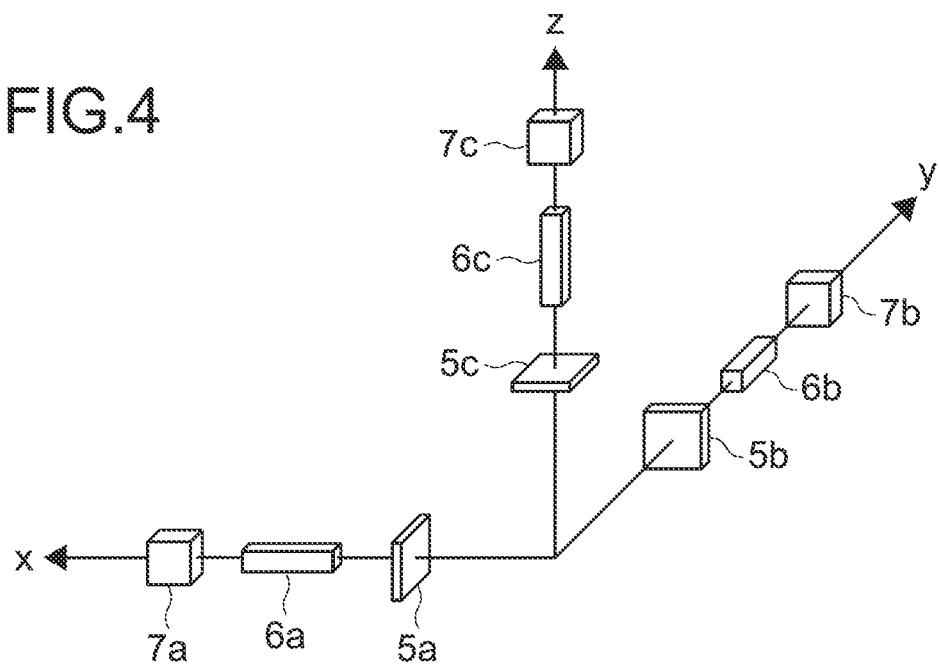
FIG. 4 is a view for explaining the detection axes of the respective sensors of the operation device and the relative arrangement between the sensors.

FIG. 4 is a view for explaining the detection axes of the respective sensors of the operation device 10 and the relative arrangement between the sensors. The acceleration sensor 5, the angular speed sensor 6, and the magnetic sensor 7 have the respective three orthogonal detection axes. In other words, the acceleration sensor 5 has the sensors (5a, 5b, and 5c) corresponding to the three detection axes. Similarly, the angular speed sensor 6 and the magnetic sensor 7 have the respective sensors (6a, 6b, and 6c) (7a, 7b, and 7c).

For example, all the sensors 5, 6, and 7 are incorporated into a common package. Alternatively, the sensors 5, 6, and 7 are incorporated into separate packages and mounted on a common sensor substrate.

In the ROM 4 and the memory (not shown) of the operation device 10 and/or the ROM 54 and the storage unit 57 of the display device 50, software that implements processing shown in FIG. 6 as described below and the like are stored. The processing shown in FIG. 6 aims at recognizing the posture and the motion of the operation device 10. In the embodiment described below, the CPU 2 and the software described above mainly serve as control units.

Figure 5:
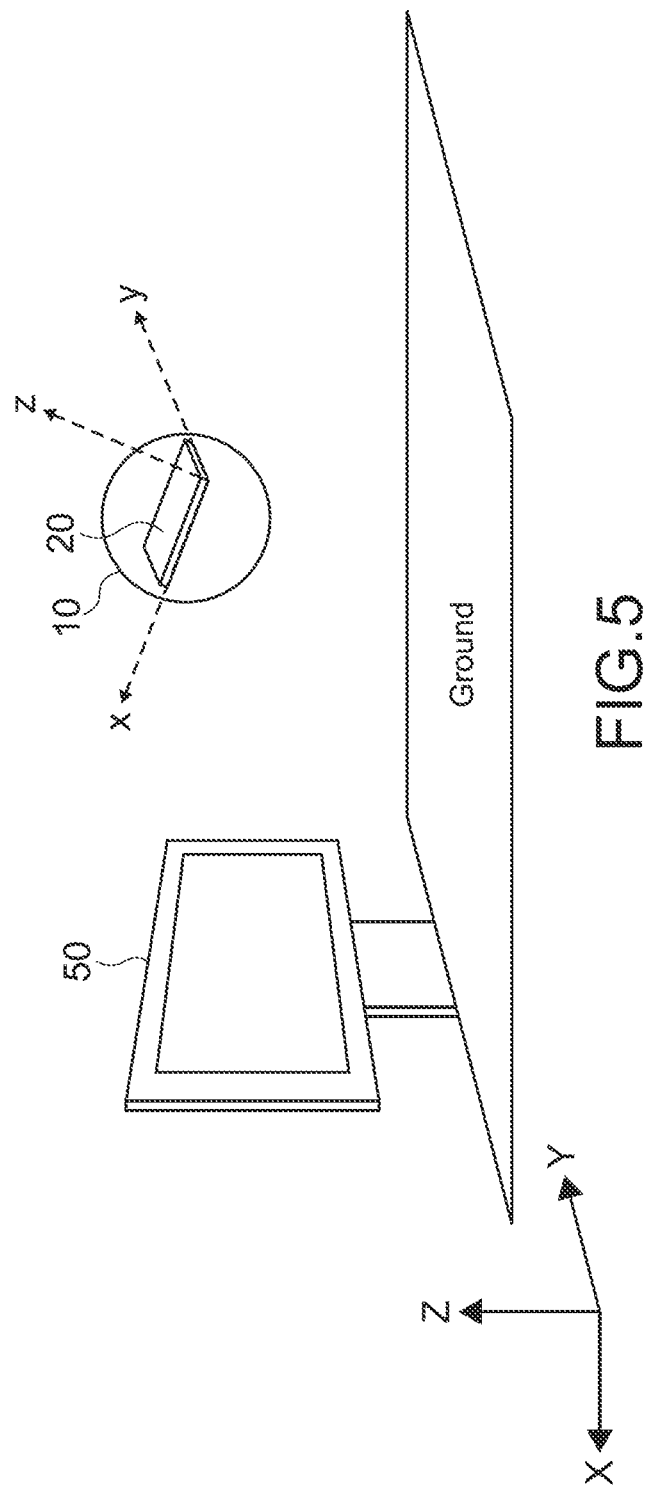
FIG. 5 is a view showing the relationship between a local coordinate system and a global coordinate system.

FIG. 5 is a view showing the relationship between a local coordinate system and a global coordinate system.

The display device 50 is placed on the ground. Here, a coordinate system fixed to the ground or the display device 50 is referred to as the global coordinate system. Further, a coordinate system capable of freely moving with respect to the global coordinate system and fixed to a sensor substrate 20 of the operation device 10 is referred to as the local coordinate system. As described above, the sensor substrate 20 is the common substrate on which the acceleration sensor 5, the angular speed sensor 6, and the magnetic sensor 7 are mounted.

In the following description, the global coordinate system will be expressed by upper-case letters (X, Y, and Z) and the local coordinate system will be expressed by lower-case letters (x, y, and z) for the sake of convenience. However, the description will be given using the expression "local" and "global" to a greater extent to make the sentences easily understandable. In the global coordinate system, the ground is an X-Y plane surface. Further, in the local coordinate system, a surface parallel to the principle surface of the substrate is an x-y plane surface.

(Basic Operation Methods of Performing Operations with Operation Device)

Figure 6:
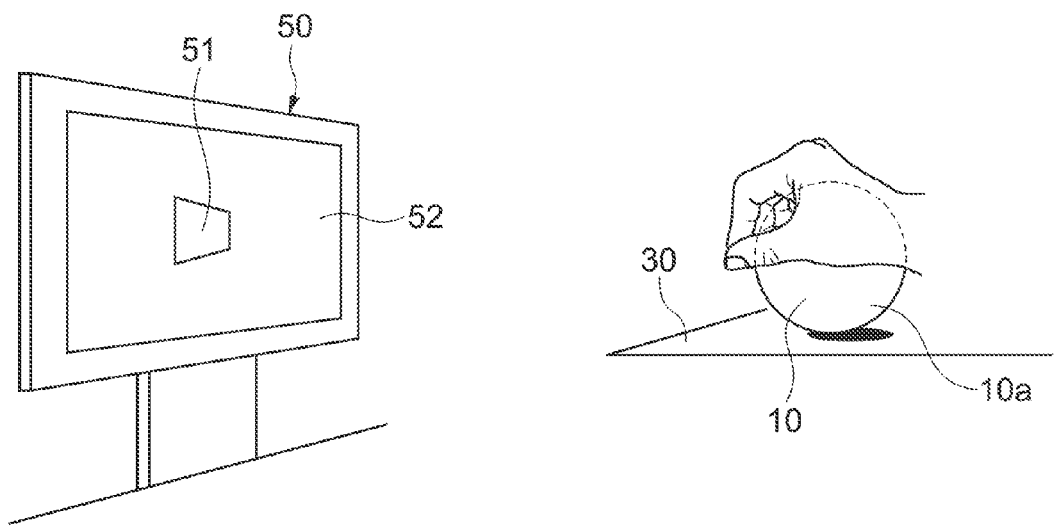
FIG. 6 is a view for explaining a basic operation method of performing a 2D operation with the operation device.
Figure 7:
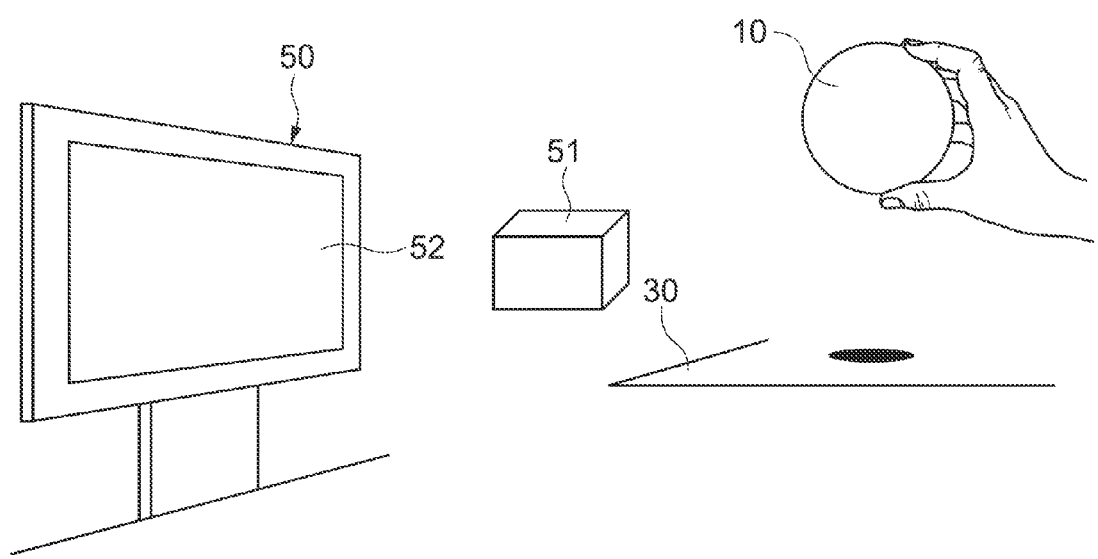
FIG. 7 is a view for explaining a basic operation method of performing a 3D operation with the operation device.

FIGS. 6 and 7 are views for explaining basic operation methods of performing operations with the operation device 10. FIG. 6 shows an example of a two-dimensional operation, and FIG. 7 shows an example of a three-dimensional operation.

As shown in FIG. 6, the user operates the operation device 10 with the outer surface 10a of the operation device 10 coming into contact with the operation surface 30, i.e., the user operates the operation device 10 to be rotated in any direction in a two-dimensional surface. Such an operation of the operation device 10 is referred to as the two-dimensional operation (hereinafter referred to as a 2D operation). In the 2D operation, the object 51 two-dimensionally displayed on the display device 50 is typically an operation object.

As shown in FIG. 7, the user operates the operation device 10 with the operation device 10 separated from the operation surface 30, i.e., the user operates the operation device 10 to be translated and rotated in any direction in a three-dimensional space. Such an operation of the operation device 10 is referred to as the three-dimensional operation (hereinafter referred to as a 3D operation). In the 3D operation, a 3D image, i.e., the object 51 three-dimensionally displayed on the display device 50 is typically an operation object.

Here, the 3D image is formed by a plurality of images including parallax and formed making use of the illusion of the human eyes. In the following description, 3D images and 2D images will be distinguished from each other.

Figure 8:
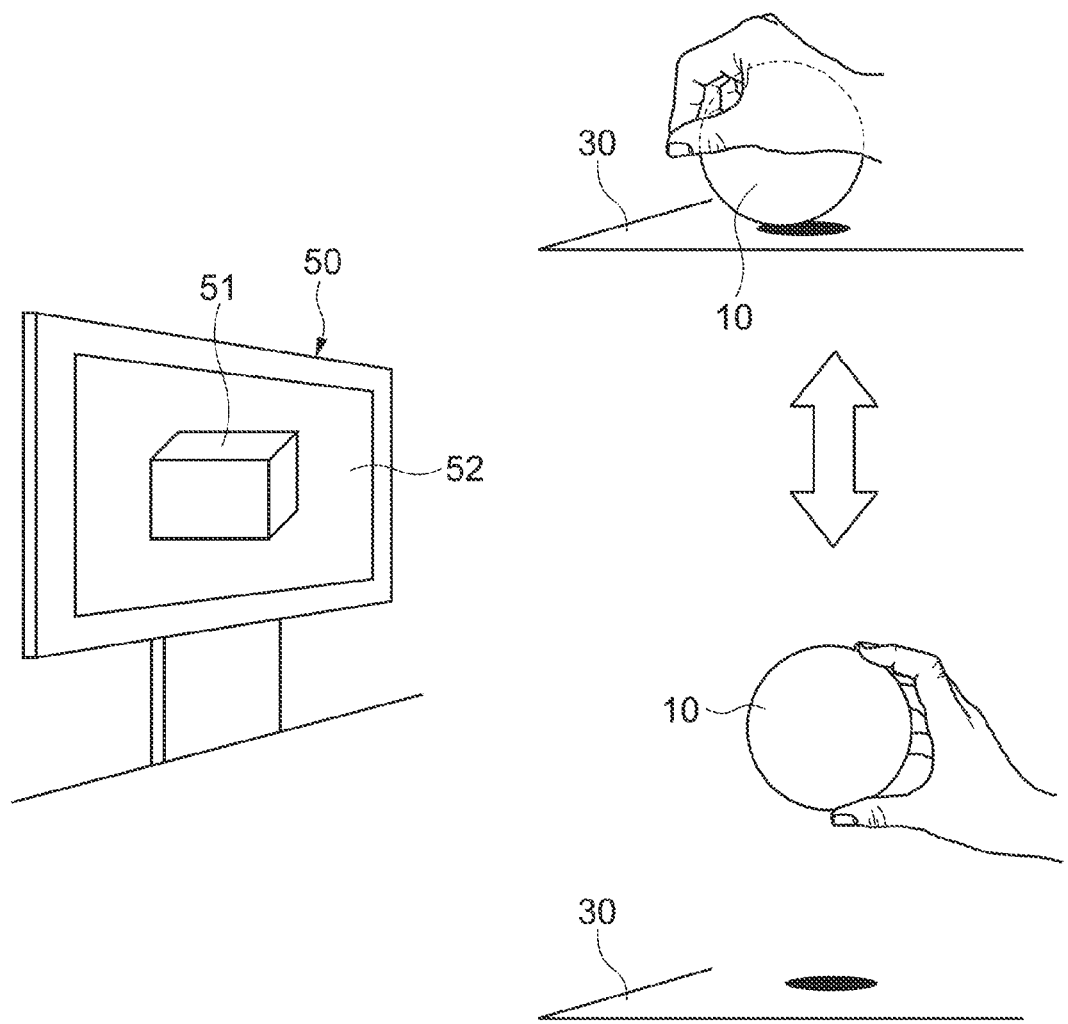
FIG. 8 is a view showing a state in which a user switches between the 2D operation and the 3D operation.

As shown in FIG. 8, the user is allowed to operate the operation device 10 by appropriately switching between the 2D operation and the 3D operation. There is a case that the user easily operates a 2D image with the 3D operation. Therefore, according to this embodiment of the present disclosure, the user may achieve the change of a 2D image with the 3D operation. Conversely, it is also presumed that the user may achieve the change of a 3D image with the 2D operation.

(Specific Method of Operating Operation Device)

(2D Operation)

Figure 9A:
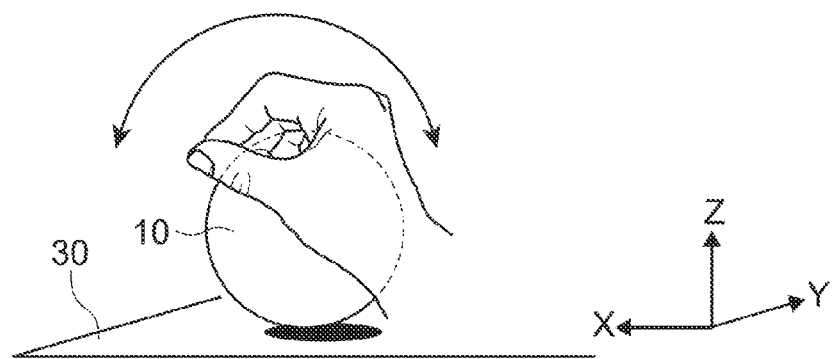
FIGS. 9A to 9C are views for explaining a specific method of performing the 2D operation.
Figure 9B:
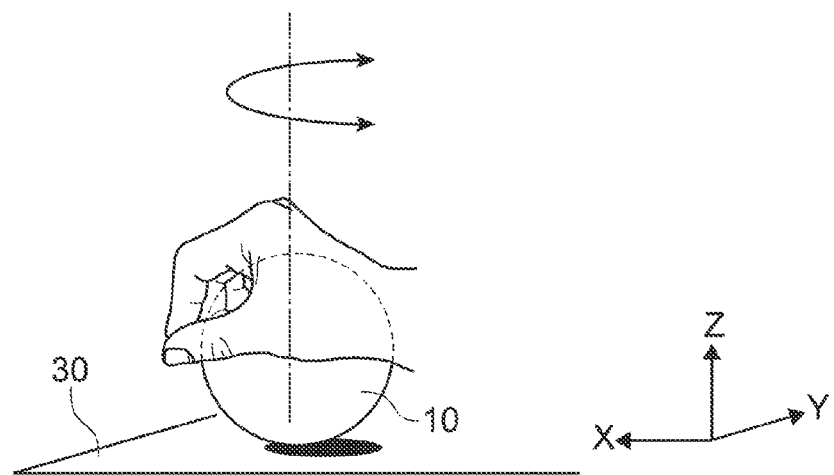
Figure 9C:
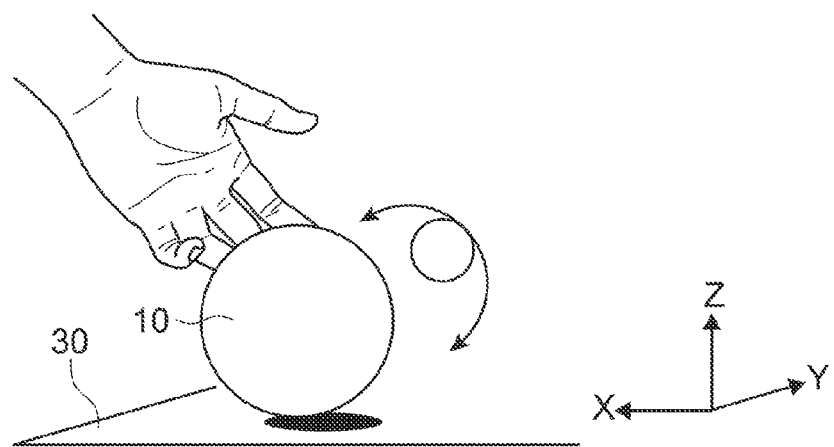

FIGS. 9A to 9C are views for explaining a specific method of performing the 2D operation.

In FIG. 9A, the user holds the operation device 10 to be sandwiched between the user's hand and the operation surface 30 and rotates the operation device 10 about an axis including at least one of the components of an X axis and a Y axis. Of course, the concept of the rotation includes the concept of inclination. The method of holding the operation device 10 by the user is not limited to the gripping method as shown in FIG. 9A, but the user may, for example, softly hold down the operation device 10 from above rather than gripping the same. In this case, the user operates the operation device 10 in such a manner as to stroke the operation device 10.

In FIG. 9B, the user holds the operation device 10 to be sandwiched between the user's hand and the operation surface 30 and rotates the operation device 10 about a Z axis. In this case, the user operates the operation device 10 in such a manner as to twist his/her wrist.

In FIG. 9C, the user rotates the operation device 10 on the operation surface 30. In this case, after the user releases the operation device 10, the operation device 10 rotates due to its inertial force based on a force given by the user and potential energy.

(3D Operation)

Figure 10A:
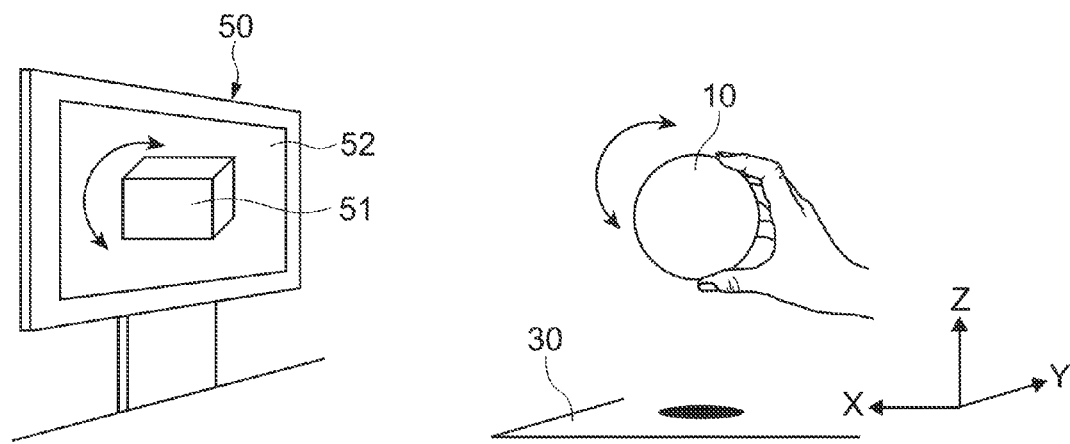
FIGS. 10A to 10C are views for explaining a specific method of performing the 3D operation.
Figure 10B:
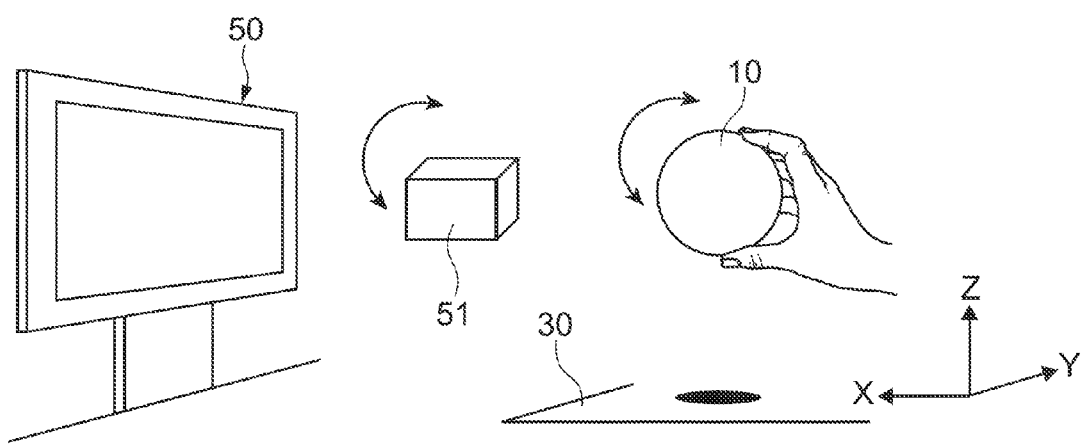
Figure 10C:
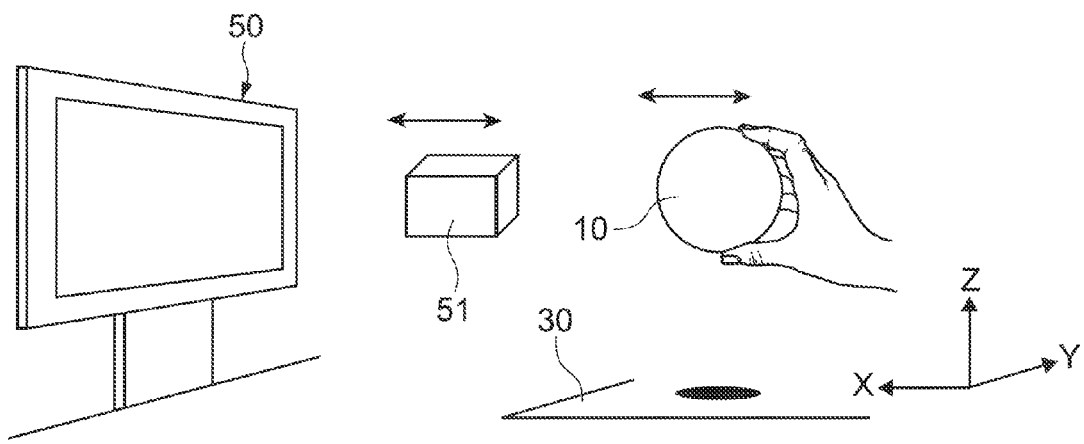

FIGS. 10A to 10C are views for explaining a specific method of performing the 3D operation.

The 3D operation is mainly performed to operate a 3D image. However, as described above, the 3D operation may be performed to operate a 2D image in the manner shown in FIG. 10A. In FIG. 10A, the user rotates the 2D object 51 in any direction.

In FIGS. 10B and 10C, the user rotates the 3D object 51 in any direction and translates the same in any direction. Thus, the user may have a feeling as if he/she touched and operated the 3D object 51.

(Processing of Operation Device)

Figure 11:
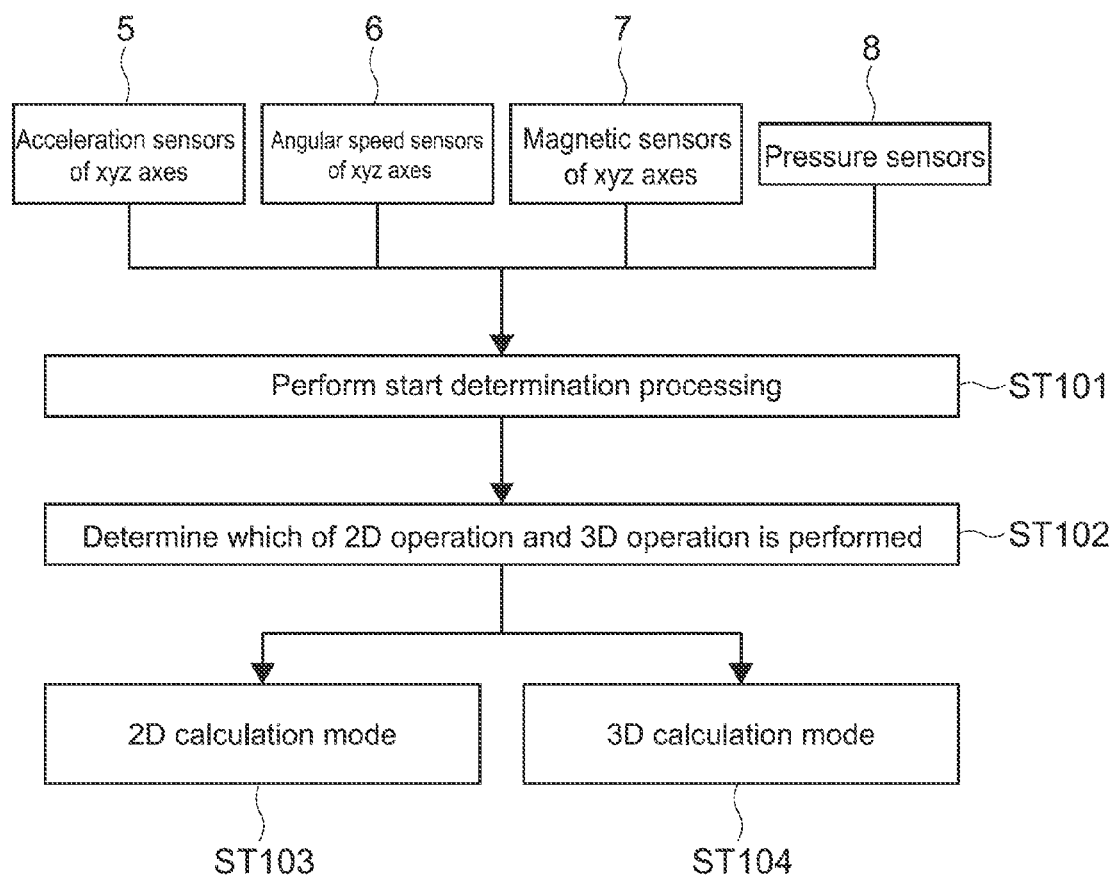
FIG. 11 is a flowchart showing the processing of the operation device.

FIG. 11 is a flowchart showing the processing of the operation device 10. The processing is implemented by the cooperation between the software resources stored in the storage devices (ROM and RAM) of the operation device 10 and hardware resources such as the CPU. In the following description, the CPU 2 will serve as the subject of the processing for the sake of convenience.

The signals of analog detection values obtained from the acceleration sensor 5, the angular speed sensor 6, the magnetic sensor 7, and the pressure sensors 8 are converted into digital signals by an A/D (Analog/Digital) converter (not shown). The CPU 2 acquires the digital signals of the respective detection values output from the A/D converter (acquisition unit) and performs start determination processing based on the information (step 101). The start determination processing determines whether the user has held the operation device 10 and has started operating the operation device 10.

The CPU 2 performs the start determination processing using the information acquired from, for example, at least one of the acceleration sensor 5, the angular speed sensor 6, the magnetic sensor 7, and the pressure sensors 8. For example, the CPU 2 may determine that the user has started operating the operation device 10 when the detection value of at least one of the sensors 5*a*, 5*b*, 5*c*, 6*a*, 6*b*, 6*c*, 7*a*, 7*b*, 7*c*, and 8 is changed.

Alternatively, the start determination processing may be performed according to the ON/OFF status of a mechanical switch such as a bottom provided in the operation device 10. Alternatively, the CPU 2 may determine that the user has started operating the operation device 10 when the information processing system starts an application.

When it is determined that the user has started operating the operation device 10, the CPU 2 determines which of the 2D operation and the 3D operation is being performed by the user, i.e., the CPU 2 determines which of a 2D calculation mode and a 3D calculation mode is being used to perform calculation (calculation for generating information used to change the object 51) (step 102). In this case, the CPU 2 serves as a determination unit.

Then, when it is determined that the user is now performing the 2D operation, the CPU 2 performs the calculation under the 2D calculation mode (step 103). On the other hand, when it is determined that the user is now performing the 3D operation, the CPU 2 performs the calculation under the 3D calculation mode (step 104). In this case, the CPU 2 serves as a calculation unit.

(Determination Processing for Determining 2D/3D Operation)

Hereinafter, determination processing for determining the 2D operation and the 3D operation in step 102 will be described. The CPU 2 may perform the determination processing using the detection values of the sensors 5 to 8. The determination processing will be described every type of the sensors.

(Pressure Sensors)

The pressure sensors 8 are uniformly dispersed near the front surface (outer surface 10*a*) of the operation device 10. When the operation device 10 is placed on the operation surface 30, at least one of the plurality of pressure sensors 8 detects a substantially constant pressure force generated by the own weight of the operation device 10. In the 2D operation, when the user puts his/her hand on the operation device 10 from above as shown in FIGS. 9A and 9B, the pressure force is further increased. That is, when at least one of the plurality of pressure sensors 8 detects that a force greater than or equal to the pressure force generated by the own weight of the operation device 10 is applied to the front surface of the operation device 10, the CPU 2 determines that the user is now performing the 2D operation.

On the other hand, in the 3D operation, the operation device 10 exists in the air (the user operates the operation device 10 in the air). Therefore, the pressure force as described above is not detected. Rather, the CPU 2 detects a value less than the pressure force generated when the user holds down the operation device 10 as described above. In this case, the CPU 2 determines that the user is now performing the 3D operation.

Note that the detection values of the pressure sensors 8 are information other than the detection values of the motion sensors (the acceleration sensor 5, the angular speed sensor 6, and the magnetic sensor 7).

(Acceleration Sensor, Angular Speed Sensor, and Magnetic Sensor)

In the 2D operation, the user places the operation device 10 on the operation surface 30 and operates the same. Therefore, the detection values of the acceleration sensor 5, the angular speed sensor 6, and the magnetic sensor 7 include substantially no component (minute vibration) caused when the hand of the user shakes.

The hand shake component is about 1 to 20 Hz. Therefore, even in that case, the hand shake component may be extracted from the detection values via a low pass filter or the like. Accordingly, with the extraction of the hand shake component, the CPU 2 determines that the user is now performing the 3D operation. Otherwise, the CPU 2 determines that the user is now performing the 2D operation.

The following various sensors are not shown in FIG. 2. However, in a case in which the operation device 10 has the following sensors, processing described below is also effective. The detection values of the following sensors are also information other than the detection values of the motion sensors.

(Capacitance Sensor)

A capacitance sensor is allowed to detect electrical capacitance in a detection area. Because the operation device 10 is grounded in the 2D operation, the detected electrical capacitance is small. In the 3D operation, capacitance having a greater value than the capacitance generated when the operation device 10 is grounded is detected. Thus, it is made possible for the capacitance sensor to perform the determination processing for determining the 2D/3D operation.

(Air Pressure Sensor)

When the 2D operation in which the user places the operation device 10 on the operation surface 30 and operates the same is compared with the 3D operation in which the user operates the operation device 10 in the air, it is found that the positioning height of the operation device 10 is different between the 2D operation and the 3D operation. It is possible for an air pressure sensor to detect the change of the height. Because an existing air pressure sensor is allowed to detect the change of an air pressure every several centimeters in height, this principle may be applied to the determination processing for determining the 2D/3D determination.

(Optical Sensor)

For example, a reflection type optical sensor is allowed to measure the distance between an object and the optical sensor by emitting light of a certain wavelength and detecting the return light of the light. In the 2D operation, the operation device 10 is sandwiched between the user's hand and the operation surface 30, and thus the optical sensor detects the return light from the operation surface 30 in a greater amount or detects the return light for a longer period of time. On the other hand, in the 3D operation, the optical sensor detects the return light for a less period of time or detects the return light in a less amount. Thus, it is made possible for the optical sensor to perform the determination processing for determining the 2D/3D operation.

(Ultrasonic Sensor)

As with the optical sensor, an ultrasonic sensor is allowed to measure the distance between the ultrasonic sensor and an object by oscillating ultrasonic waves and detecting the ultrasonic waves bounced from the object. Because the ultrasonic sensor is allowed to detect the peripheral environment of the operation device 10 in the same manner as the optical sensor described above, it is made possible for the ultrasonic sensor to perform the determination processing for determining the 2D/3D operation.

(Distortion Sensor)

A distortion sensor has precision enough to detect a distortion of several μm by detecting the resistance change of wiring. In the 2D operation, the operation device 10 is sandwiched between the user's hand and the operation surface 30, which results in distortion in the operation device 10. The distortion sensor detects this distortion. In the 3D operation, such distortion hardly occurs or slightly occurs. Thus, it is made possible for the distortion sensor to perform the determination processing for determining the 2D/3D operation.

If each of the sensors described above has low precision, detection with at least two of the sensors may be used in combination to perform the determination processing for determining the 2D/3D operation. As a result, an improvement in the precision of the determination processing is made possible.

The method of the determination processing for determining the 2D/3D operation is not limited to the manners described above using the detection values of the sensors. For example, the 2D/3D calculation mode may be switched by a switch such as a mechanical button provided in the operation device 10 or may be switched by a switching function on application software. The button switch and the switch on the application software are switched by the operation of the user. Alternatively, in a case in which the user holds the operation device 10 with an intentional force applied to the operation device 10 and the pressure sensors detect the pressure force exceeding a threshold, the 2D/3D operation may be switched. With such configurations, the calculation mode is switched in accordance with the intention of the user.

(Calculation Processing under 2D/3D Calculation Mode)

Next, calculation processing under the 2D calculation mode and the 3D calculation mode will be described.

(2D Calculation Mode)

Figure 12:
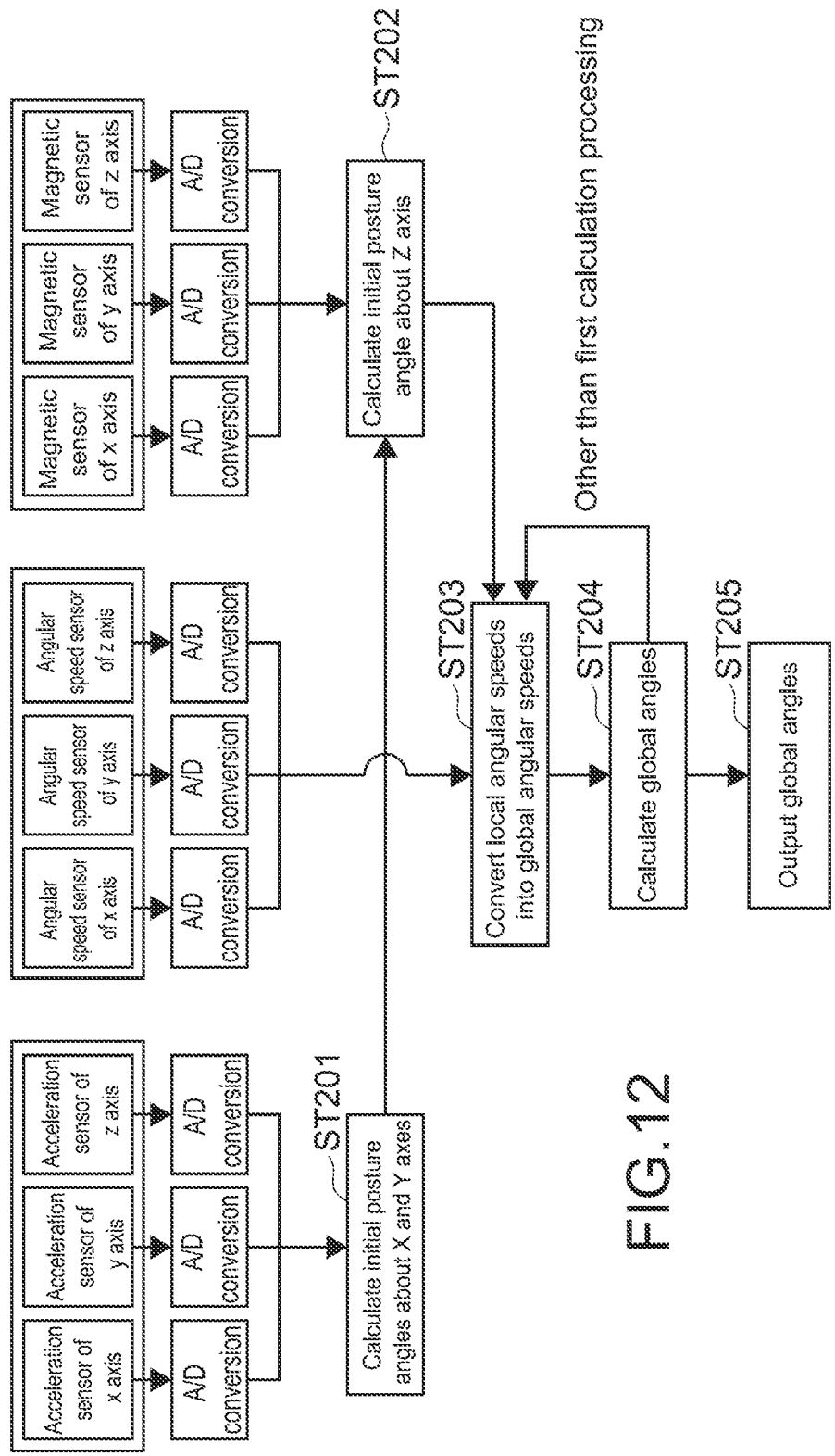
FIG. 12 is a flowchart showing calculation processing under a 2D calculation mode.

FIG. 12 is a flowchart showing the calculation processing under the 2D calculation mode. The operation device 10 is spherical in outer shape. Therefore, because the vertical and horizontal directions of the operation device 10 are not specified, it is necessary for the CPU 2 to recognize the posture of the operation device 10 at the present moment.

In step 201, when the user starts operating the operation device 10, the initial posture angles of the operation device 10 about global X and Y axes (the X and Y axes in the global coordinate system) are calculated based on information on acceleration (acceleration ($a_x$ and $a_y$) particularly in the directions of x and y axes) detected by the acceleration sensor 5.

Figure 13:
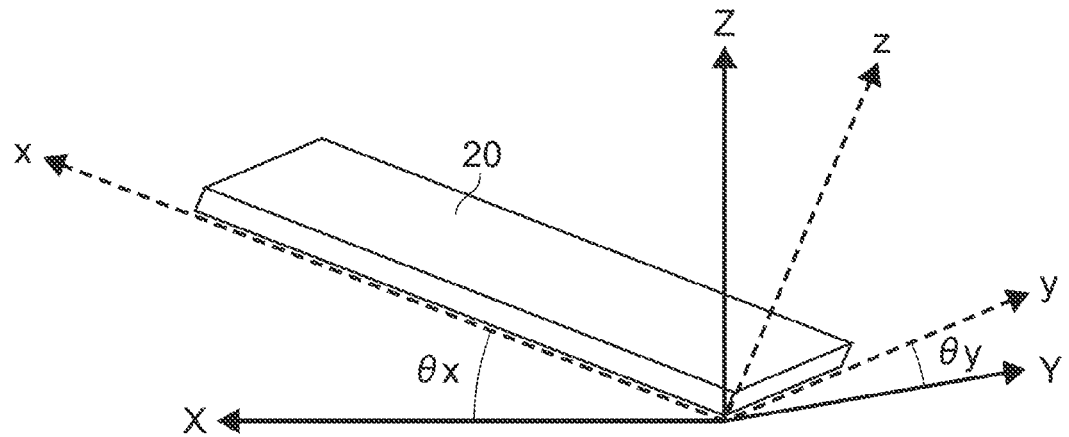
FIG. 13 is a view for explaining the principle of the calculation processing and shows a state in which a sensor substrate is inclined in the global coordinate system.

FIG. 13 is a view for explaining the principle of the calculation processing and shows a state in which (the posture of) the sensor substrate 20 is inclined in the global coordinate system.

Figure 14:
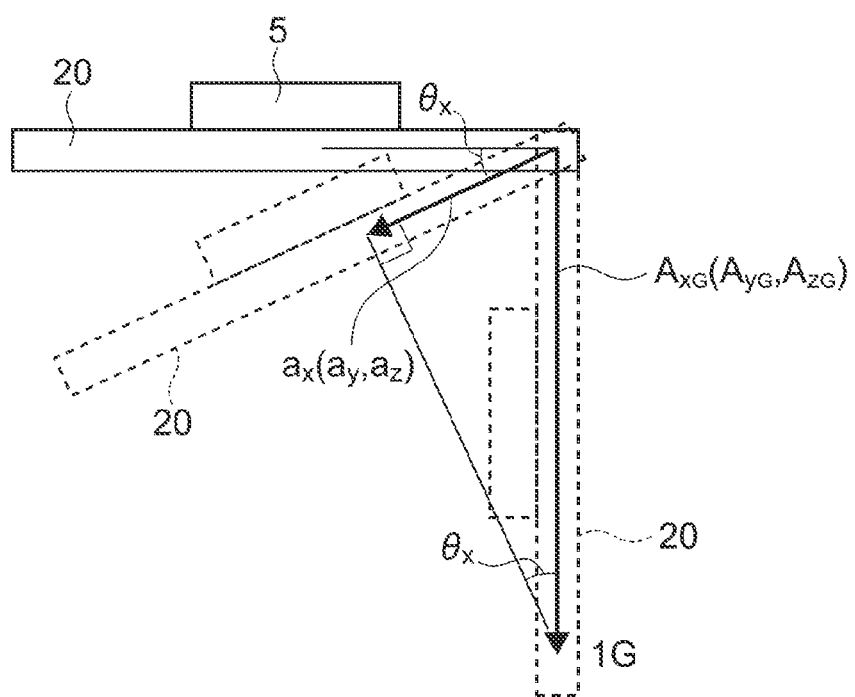
FIG. 14 is a view for explaining, as with FIG. 13, the principle of the calculation processing shown in FIG. 12.

For example, the initial posture angle of the operation device 10 about the global Y axis, i.e., the angle $\theta_x$ of the sensor substrate 20 relative to the X axis is calculated according to the following formula 1 based on the information on the acceleration $a_x$. In the formula 1, as shown in FIG. 14, $A_{xG}$ represents the value of, for example, gravitational acceleration 1 G detected by the acceleration sensor 5a of the x axis, and $a_x$ represents the value of the acceleration sensor 5a in a state in which the sensor substrate 20 is inclined (in a state in which the acceleration sensor 5(5a) is inclined).

Similarly, the initial posture angle of the operation device 10 about the global X axis, i.e., the angle $\theta_y$ of the sensor substrate 20 relative to the Y axis is calculated according to the following formula 2 based on the information on the acceleration $a_y$. $A_{yG}$ represents the value of the acceleration sensor 5b of the y axis with respect to the gravitational acceleration 1 G.

$$\left. \begin{array}{l} \text{When } a_x < 0, a_z > 0, \\ \theta_x = -\text{asin}(a_x / A_{xG}) \\ \text{When } a_x < 0, a_z < 0, \\ \theta_x = 180 + \text{asin}(a_x / A_{xG}) \\ \text{When } a_x > 0, a_z < 0, \\ \theta_x = 180 + \text{asin}(a_x / A_{xG}) \\ \text{When } a_x > 0, a_z > 0, \\ \theta_x = 360 - \text{asin}(a_x / A_{xG}) \end{array} \right\} \text{Formula 1}$$

$$\left. \begin{array}{l} \text{When } a_y < 0, a_z > 0, \\ \theta_y = -\text{asin}(a_y / A_{yG}) \\ \text{When } a_y < 0, a_z < 0, \\ \theta_y = 180 + \text{asin}(a_y / A_{yG}) \\ \text{When } a_y > 0, a_z < 0, \\ \theta_y = 180 + \text{asin}(a_y / A_{yG}) \\ \text{When } a_y > 0, a_z > 0, \\ \theta_y = 360 - \text{asin}(a_y / A_{yG}) \end{array} \right\} \text{Formula 2}$$

$A_{xG}$ and $A_{yG}$: gravitational acceleration 1 G detected by the acceleration sensors 5a and 5b of the x and y axes $a_x$, $a_y$, and $a_z$: present values (local acceleration) detected by the acceleration sensors 5a, 5b, and 5c of the x, y, and z axes $\theta_x$ and $\theta_y$: initial posture angles of the sensor substrate relative to the X and Y axes in the global coordinate system Note that the sine is used in the formulae 1 and 2, but the initial posture angles may be calculated according to a cosine and other calculation methods.

Next, in step 202, the initial posture angle (direction) of the operation device 10 about a global Z axis (the z axis in the global coordinate system) is calculated based on the information calculated in step 201 and information on magnetic intensity in the directions of the respective axes in the local coordinate system detected by the magnetic sensor 7.

The following formula 3 is used in this calculation. In the formula 3, $h_x$, $h_y$, and $h_z$ represent the magnetic intensity detected by the magnetic sensors 7a, 7b, and 7c of the x, y, and z axes (local magnetic intensity). Further, $H_x$, $H_y$, and $H_z$ represent the magnetic intensity in the directions of the global X, Y, and Z axes obtained by the calculation (global magnetic intensity).

$$\left.\begin{array}{l}H_x = h_x\cos\theta_y + h_y\sin\theta_x\sin\theta_y - h_z\cos\theta_x\sin\theta_y \\ H_y = h_y\cos\theta_x + h_z\sin\theta_x \\ \theta_z(\text{direction}) = \arctan(H_y/H_x)\end{array}\right\} \text{Formula 3}$$

$h_x$, $h_y$, and $h_z$: magnetic intensity in the directions of the x, y, and z axes in the local coordinate system (local magnetic intensity)

$H_x$ and $H_y$: magnetic intensity in the directions of the global X and Y axes (global magnetic intensity)

$\theta_z$: initial posture angle (direction) about the global Z axis

With the use of the magnetic sensor 7 that detects the earth's magnetism, the operation device 10 is allowed to recognize the direction of the sensor substrate 20 about the global Z axis. In performing the calculation according to the formulae 1 to 3, the CPU 2 and software in which information on the calculation is described serve as initial angle calculation units.

In the manner described above, according to the calculation processing in steps 201 and 202, the operation device 10 is allowed to recognize the initial posture of the sensor substrate 20 (inclination relative to the X, Y, and Z axes) in the global coordinate system. That is, even if the user is not aware of the gripping manner, the direction, or the like of the operation device 10, the operation device 10 is allowed to recognize its own posture. As a result, the user is allowed to start operating the operation device 10 in any posture in a two-dimensional surface.

Next, in step 203, angular speeds detected by the angular speed sensor 6 when the user starts operating the operation device 10, i.e., immediately after the user starts operating the operation device 10, are converted into global angular speeds in the global coordinate system based on the information on the initial posture angles ($\theta_x$, $\theta_y$, and $\theta_z$) calculated in steps 201 and 202. In other words, this conversion processing refers to rotating coordinate conversion processing. The following formula 4 is used in this calculation processing. In this case, the CPU 2 and software in which information on the calculation is described serve as coordinate conversion units.

$$\begin{pmatrix}W_x \\ W_y \\ W_z\end{pmatrix} = \begin{pmatrix}1 & 0 & 0 \\ 0 & \cos\theta_x & \sin\theta_x \\ 0 & -\sin\theta_x & \cos\theta_x\end{pmatrix} \quad \text{Formula 4}$$

$$\begin{pmatrix}\cos\theta_y & 0 & -\sin\theta_y \\ 0 & 1 & 0 \\ \sin\theta_y & 0 & \cos\theta_y\end{pmatrix}\begin{pmatrix}\cos\theta_z & \sin\theta_z & 0 \\ -\sin\theta_z & \cos\theta_z & 0 \\ 0 & 0 & 1\end{pmatrix}\begin{pmatrix}w_x \\ w_y \\ w_z\end{pmatrix}$$

$w_x$, $w_y$, and $w_z$: angular speeds about the local x, y, and z axes (local angular speeds)

$W_x$, $W_y$, and $W_z$: angular speeds about the global X, Y, and Z axes (global angular speeds)

In step 204, an angle $R_x$ about the global X axis is calculated using the global angular speeds thus calculated. That is, a global angle (a component in the direction of the X axis) is calculated. The following formula 5 is used in this calculation processing. The calculation processing uses a trapezoidal integration method. Angles $R_y$ and $R_z$ about the global Y and Z axes are also calculated in the same manner as the angle $R_x$. The processing of step 204 aims at changing the initial posture angles ($\theta_x$, $\theta_y$, and $\theta_z$) to the new posture angles ($R_x$, $R_y$, and $R_z$), i.e., updating of the posture angles. In this case, the CPU 2 and software in which information on the calculation is described serve as update units.

$$R_x(t_n) = \frac{(W_x(t_{n-1}) + W_x(t_n)) \times \Delta t}{2} \quad \text{Formula 5}$$

$R_x$: angle about the X axis in the global coordinate system (global angle (global posture angle))

$(t_n)$: value obtained in the n-th place $\Delta t = t_n - t_{n-1}$

When the global angles are calculated as described above, the transmitter 9 transmits (outputs) the information to the display device 50 (step 205). At the present moment, the global angles are initial global angles (i.e., the global angles when the user starts operating the operation device 10). The display device 50 receives the information. The display device 50 assigns values, which are obtained by multiplying the angles ($R_y$ and $R_x$) among the initial global angles ($R_x$, $R_y$, and $R_z$) by a constant, to the coordinate values (X and Y) of the object 51 on the screen of the display unit 52. In this manner, the initial posture of the operation device 10 is made to correspond to the initial posture (coordinates) of the object 51.

Further, the display device 50 displays, when receiving information on the second and subsequent global angles, the object 51 having a position or posture in the screen corresponding to the global angles on the display unit 52. In this case, the object 51 may move in the screen or rotate in accordance with the angle of the operation device 10 rotated by the user. The displaying manner of the object 51 depends on an application.

Note that the global angles may be calculated according to various integration processing such as a midpoint method and a Simpson method besides the trapezoidal integration method as in the formula 5.

Here, in the first calculation processing of step 203, the coordinate conversion unit performs the coordinate conversion processing on the local angular speeds (initial values) based on the information on the initial posture angles ($\theta_x$, $\theta_y$, and $\theta_z$). However, in the second and subsequent calculation processing (other than the first calculation processing) of step 203, the coordinate conversion unit performs the coordinate conversion processing on the local angular speeds (second and subsequent values) based on the information on the global angles ($R_x$, $R_y$, and $R_z$) calculated in step 204. The following formula 6 is used in this calculation processing.

$$\begin{pmatrix}W_x \\ W_y \\ W_z\end{pmatrix} = \begin{pmatrix}1 & 0 & 0 \\ 0 & \cos R'_x & \sin R'_x \\ 0 & -\sin R'_x & \cos R'_x\end{pmatrix} \quad \text{Formula 6}$$

$$\begin{pmatrix}\cos R'_y & 0 & -\sin R'_y \\ 0 & 1 & 0 \\ \sin R'_y & 0 & \cos R'_y\end{pmatrix}\begin{pmatrix}\cos R'_z & \sin R'_z & 0 \\ -\sin R'_z & \cos R'_z & 0 \\ 0 & 0 & 1\end{pmatrix}\begin{pmatrix}w_x \\ w_y \\ w_z\end{pmatrix}$$

The global angles of the operation device 10 are changed gradually (every moment). More specifically, in the formula 6, the rotating coordinate conversion processing is performed based on the values of the global angles successively added as described below.

$R_{x'} = R_x(t_n) + R_x(t_{n+1})$ $R_{y'} = R_y(t_n) + R_y(t_{n+1})$ $R_{z'} = R_z(t_n) + R_z(t_{n+1})$

However, in the formula 6 (also in the following formula 7), the angles ($R_x$, $R_y$, and $R_z$) may be used instead of the angles ($R_x$, $R_y$, and $R_z$) depending on the specifications of software for displaying an image on the display device 50.

As described above, once the initial posture angles are calculated, the second and subsequent calculation processing uses the global angles calculated in step 204 instead of the initial posture angles. A reason for this will be described below.

When the user starts operating the operation device 10, local angular speeds are converted into global angular speeds using information on initial posture angles calculated based on information including acceleration obtained by the acceleration sensor 5. That is, at the moment at which the user starts operating the operation device 10, the acceleration sensor 5 substantially detects gravitational acceleration only. The initial posture angles are calculated based on information including the gravitational acceleration, and the coordinate conversion processing is performed based on the initial posture angles.

However, during a user's subsequent operation, the acceleration sensor 5 detects a value obtained by adding motion acceleration (inertial acceleration) to the gravitational acceleration. In other words, the posture of the sensor substrate 20 changes every moment during the user's operation. Accordingly, in a case in which the posture angles are calculated based on such acceleration including the motion acceleration obtained by the acceleration sensor 5 during the user's operation, an error may occur.

To this end, according to this embodiment, local angular speeds obtained after local angular speeds obtained as initial values are subjected to the coordinate conversion processing based on information including no information on motion acceleration, i.e., based on information on posture angles updated at least once using the local angular speeds (information obtained via at least one calculation processing of steps 203 and 204). This is because the values of the local angular speeds are hardly affected by the motion acceleration.

According to such calculation processing, it is possible to prevent a situation in which motion acceleration generated during the user's operation of the operation device 10 affects the calculation of the posture angles of the operation device 10 and causes an error in the calculation.

(3D Calculation Mode)

Figure 15:
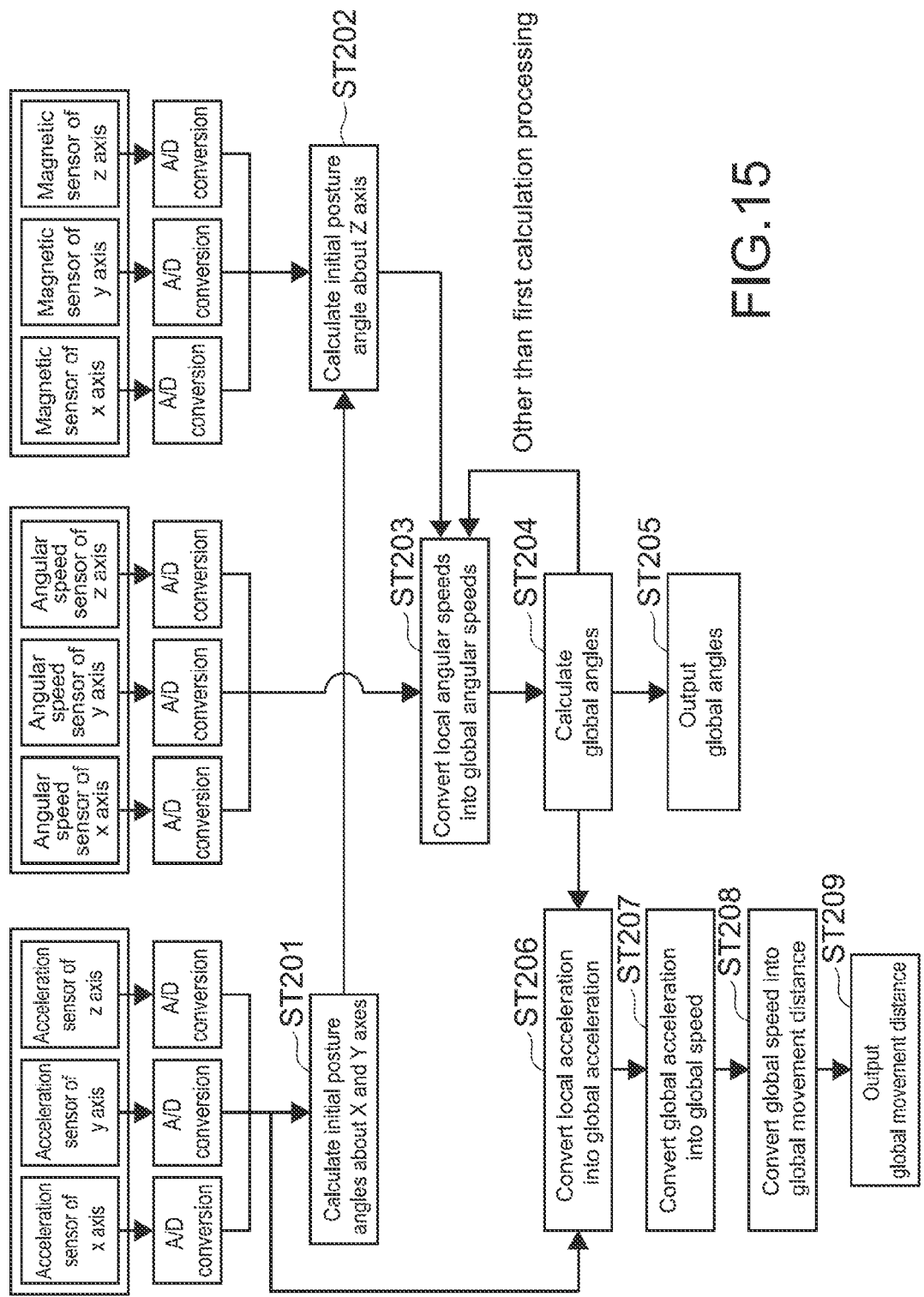
FIG. 15 is a flowchart showing calculation processing under a 3D calculation mode.

Next, processing under the 3D calculation mode will be described. FIG. 15 is a flowchart showing information on the processing under the 3D calculation mode.

In the 3D calculation mode, the CPU 2 also performs the same processing as the processing shown in FIG. 12 up to step 205. When the user rotates the operation device 10, the CPU 2 transmits information on the global angles calculated in step 205 shown in FIG. 12 to the display device 50. The display device 50 receives the information and generates the object 51 based on the information. Thus, in accordance with the rotation angle of the operation device 10, the object 51 is displayed on the display unit 52 so as to rotate with the rotation angle.

Referring to FIG. 15, the information on the global angles ($R_x$, $R_y$, and $R_z$) calculated in step 204 is used for processing in step 206. In step 206, as with the formula 6, the coordinate conversion unit converts local acceleration into global acceleration using the information on the global angles. The following formula 7 is used in this calculation processing.

$$\begin{pmatrix} A_x \\ A_y \\ A_z \end{pmatrix} = \begin{pmatrix} 1 & 0 & 0 \\ 0 & \cos R'_x & \sin R'_x \\ 0 & -\sin R'_x & \cos R'_x \end{pmatrix}$$

$$\begin{pmatrix} \cos R'_y & 0 & -\sin R'_y \\ 0 & 1 & 0 \\ \sin R'_y & 0 & \cos R'_y \end{pmatrix} \begin{pmatrix} \cos R'_z & \sin R'_z & 0 \\ -\sin R'_z & \cos R'_z & 0 \\ 0 & 0 & 1 \end{pmatrix} \begin{pmatrix} a_x \\ a_y \\ a_z \end{pmatrix}$$

Formula 7

$A_x$, $A_y$, $A_z$: acceleration about the global X, Y, and Z axes (global acceleration)

As described above, in step 206, the CPU 2 also performs the coordinate conversion processing based on the information on the global angles in calculation processing other than the initial calculation processing.

Next, in step 207, a speed is calculated based on the global acceleration calculated in step 206. Then, in step 208, a movement distance (translation distance) is calculated from the speed. Such calculation processing may be performed using the various integration methods in step 204 described above. In step 209, the operation device 10 transmits (outputs) information on the calculated distance to the display device 50. The display device 50 receives the information on the distance and displays the object 51 on the display unit 52 to be moved by the corresponding distance.

Of course, when the user rotates and translates the operation device 10, the display device 50 rotates and translates the object 51 correspondingly.

As described above, the information on the posture angles updated in step 204 includes no information on the motion acceleration. Therefore, with the conversion of the local acceleration into the global acceleration based on the information on the posture angles, the motion of the operation device 10 may be faithfully reproduced as the motion of the object 51. Thus, the user is allowed to perform the intuitive operation of the operation device 10.

As described above, according to this embodiment, because the operation device 10 determines which of the two-dimensional calculation mode and the three-dimensional calculation mode is used to perform the calculation, it is possible for the operation device 10 to support both the two-dimensional operation and the three-dimensional operation of the user. Accordingly, it is not necessary for the user to use separate input apparatuses and is thus allowed to easily perform both the two-dimensional operation and the three-dimensional operation.

Further, according to this embodiment, even if the operation device 10 held by the user is in any posture in the three-dimensional space, it is possible for the operation device 10 to recognize the posture of the sensor substrate 20 while preventing an error from occurring in the calculation and is also possible for the user to operate the object 51 with the operation device 10.

In the above description, the operation device 10 performs all the processing shown in FIGS. 11, 12, and 15. However, the display device 50 may perform part of the processing shown in FIGS. 11, 12, and 15. For example, the operation device 10 may perform the processing up to step 101 or 102 in FIG. 11, and the display device 50 may perform the processing after step 102, 103, or 104.

The responsibility of performing the processing by the operation device 10 and the display device 50 may be appropriately determined according to peripheral conditions such as their calculation processing performance, costs, and chip sizes.

In the above description, the motion of the operation device 10 corresponds to (is the same as) the motion of the object 51, but they may not be necessarily the same. For example, it is also possible to display the object 51 such that the motion of the object 51 is accelerated, decelerated, or stopped according to the predetermined motion of the operation device 10.

Further, it is also possible that the pressure sensors 8 detect a pressure position and a pressure force when the user holds the operation device 10 and applies a force to the same and that the display device 50 generate an image to deform the object 51 according to the pressure position and the pressure force.

In a FPS (First Person Shooter: video game with a function allowing the user to operate an object from his/her subjective viewpoint), it is possible to implement a function such as allocating the rotation of the operation device 10 to the movement of a user's viewpoint (movement of an entire screen).

APPLICATION EXAMPLES

First Application Example

Figure 16:
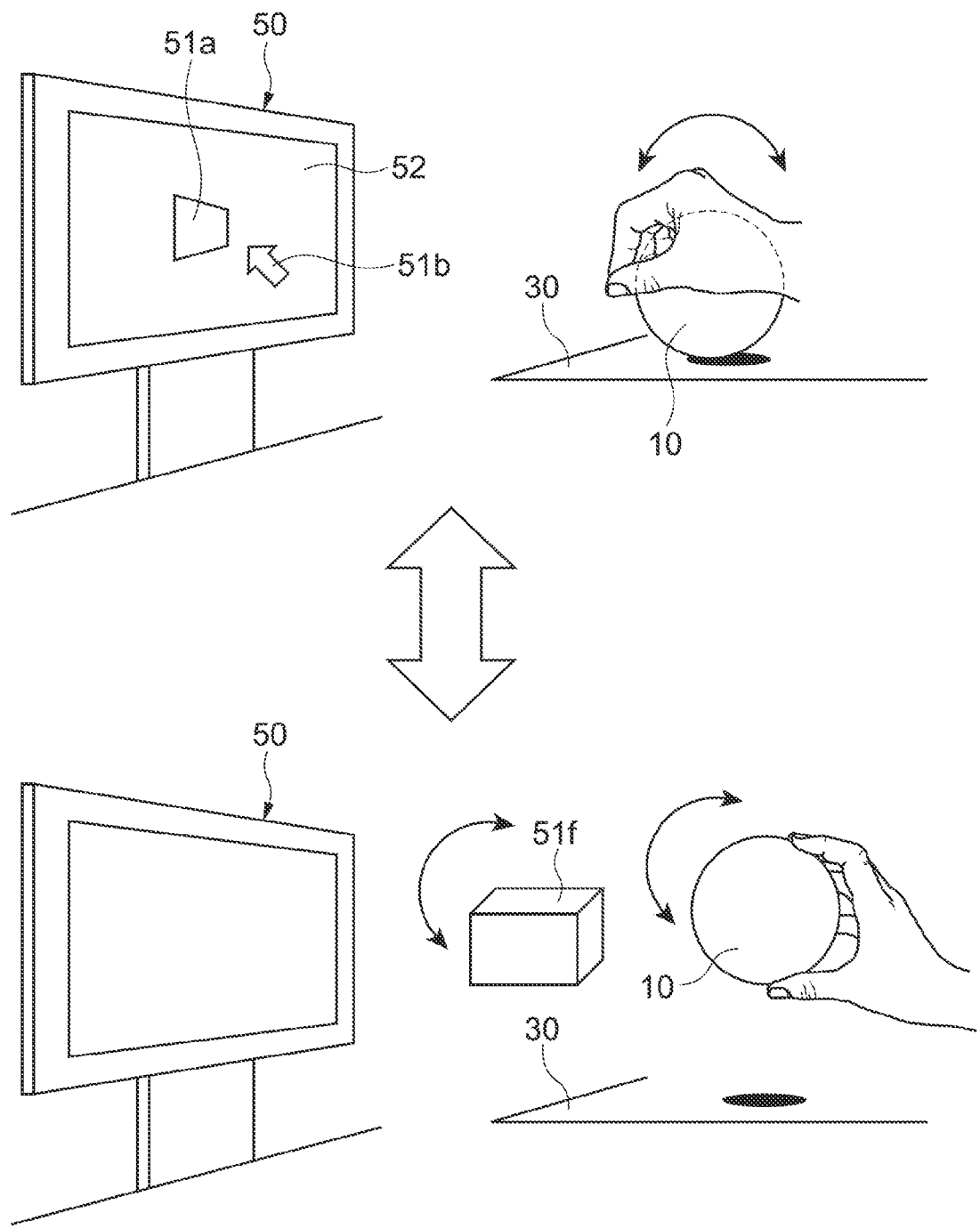
FIG. 16 is a view for explaining a first application example of the information processing system.

FIG. 16 is a view for explaining a first application example of the information processing system. In this example, in the 2D operation shown in the upper part of FIG. 16, the operation device 10 or the display device 50 generates information for moving an image (first operation object image) to be displayed on the screen according to the motion of the operation device 10. In the 3D operation shown in the lower part of FIG. 16, the operation device 10 or the display device 50 generates information for moving an image (second operation object image), which is displayed on the screen and different from the object 51 displayed in the 2D operation, on the screen according to the motion of the operation device 10.

The generation of the information is specifically described below. In the upper part of FIG. 16, the user moves a pointer 51b on the screen by performing the 2D operation of the operation device 10 and selects an object 51a. In this case, the operation device 10 (or the display device 50) generates a pointer image. For example, the user may specify (click) the object 51a with the pointer 51b by holding the operation device 10 and applying a force to the same or by pressing a button.

The first operation object image is the pointer 51b. Then, when the user selects the object 51a, the object 51a becomes the first operation object image in turn. The user is allowed to operate the selected object 51a by performing the 2D operation with the operation device 10. In other words, the operation device 10 (or the display device 50) generates information for moving the image selected by the pointer 51b.

On the other hand, when the user removes and lifts the operation device 10 from the operation surface 30, the 2D calculation mode is switched to the 3D calculation mode by the determination processing for determining the 2D/3D operation described above. In the 3D operation, the display device 50 displays an object 51f as a 3D image. In this case, the 3D image becomes the second operation object image.

Note that switching of the operations from the 2D operation to the 3D operation may be performed by a switch such as a mechanical button provided in the operation device 10 or may be performed by a switching function on application software as described above.

Second Application Example

Figure 17:
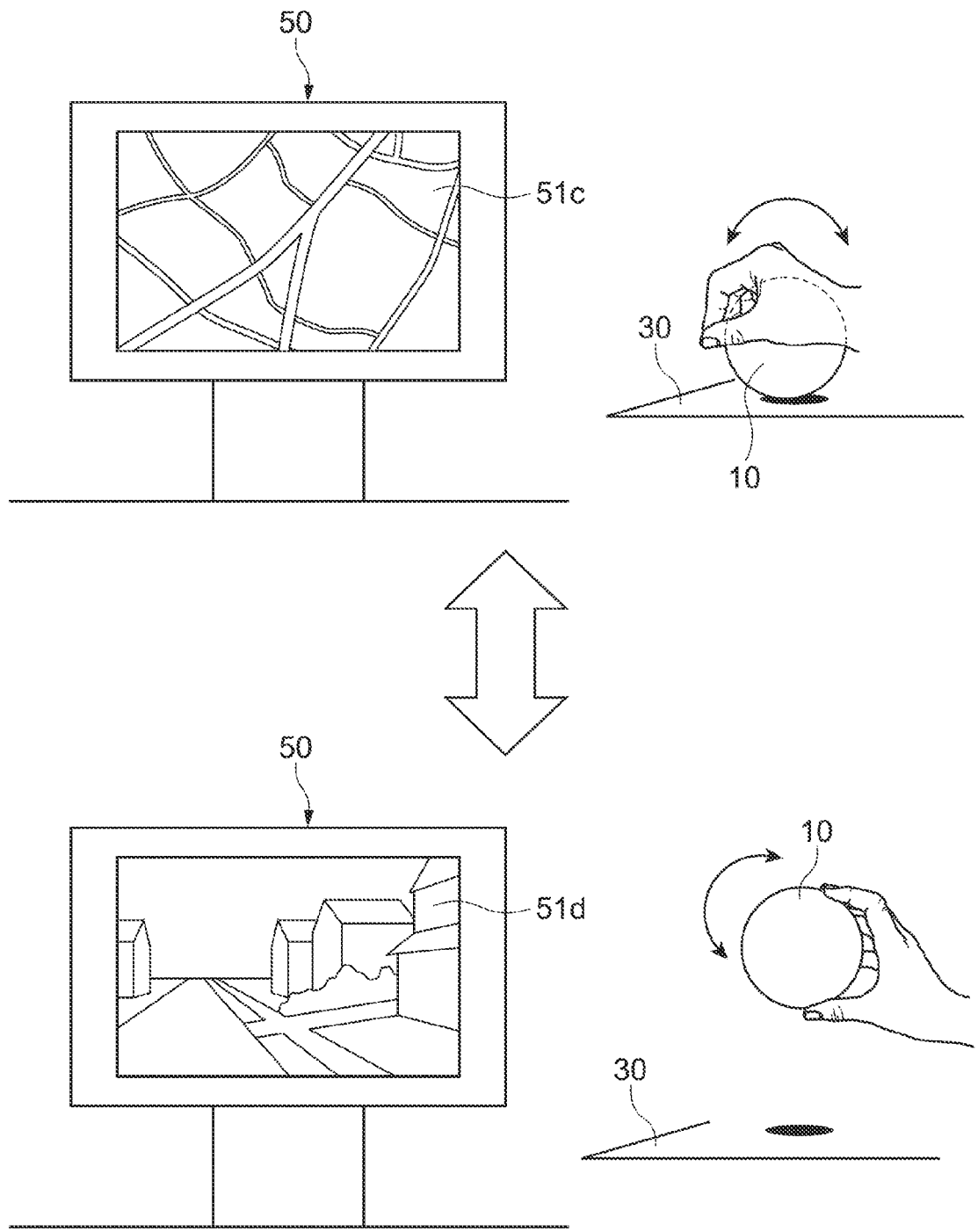
FIG. 17 is a view for explaining a second application example of the information processing system.

FIG. 17 is a view for explaining a second application example of the information processing system.

In the 2D operation shown in the upper part of FIG. 17, a two-dimensional map image 51c is an operation object image. When the user moves the operation device 10, the map image 51c is scanned (panned).

In the 3D operation shown in the lower part of FIG. 17, a map-like image 51d with an FPS function having depth information is an operation object image different from the two-dimensional map image 51c. However, the image 51d is associated with the position of at least one coordinate among a group of coordinates constituting the map image 51c and stored in a storage device such as the storage unit 57 (image storage unit). In this case, when the user specifies a predetermined position (coordinate position) of the map image 51c, the image 51d constituting a landscape and a townscape around the position is generated. The image 51d may be a 2D image or a 3D image. When the user moves and rotates the operation device 10 vertically and horizontally, application software causes the image 51d to move according to motion previously associated with such moving and rotating motion of the operation device 10. In other words, in the second application example, the viewpoint of the user is changed depending on the 2D/3D operation.

Third Application Example

Figure 18:
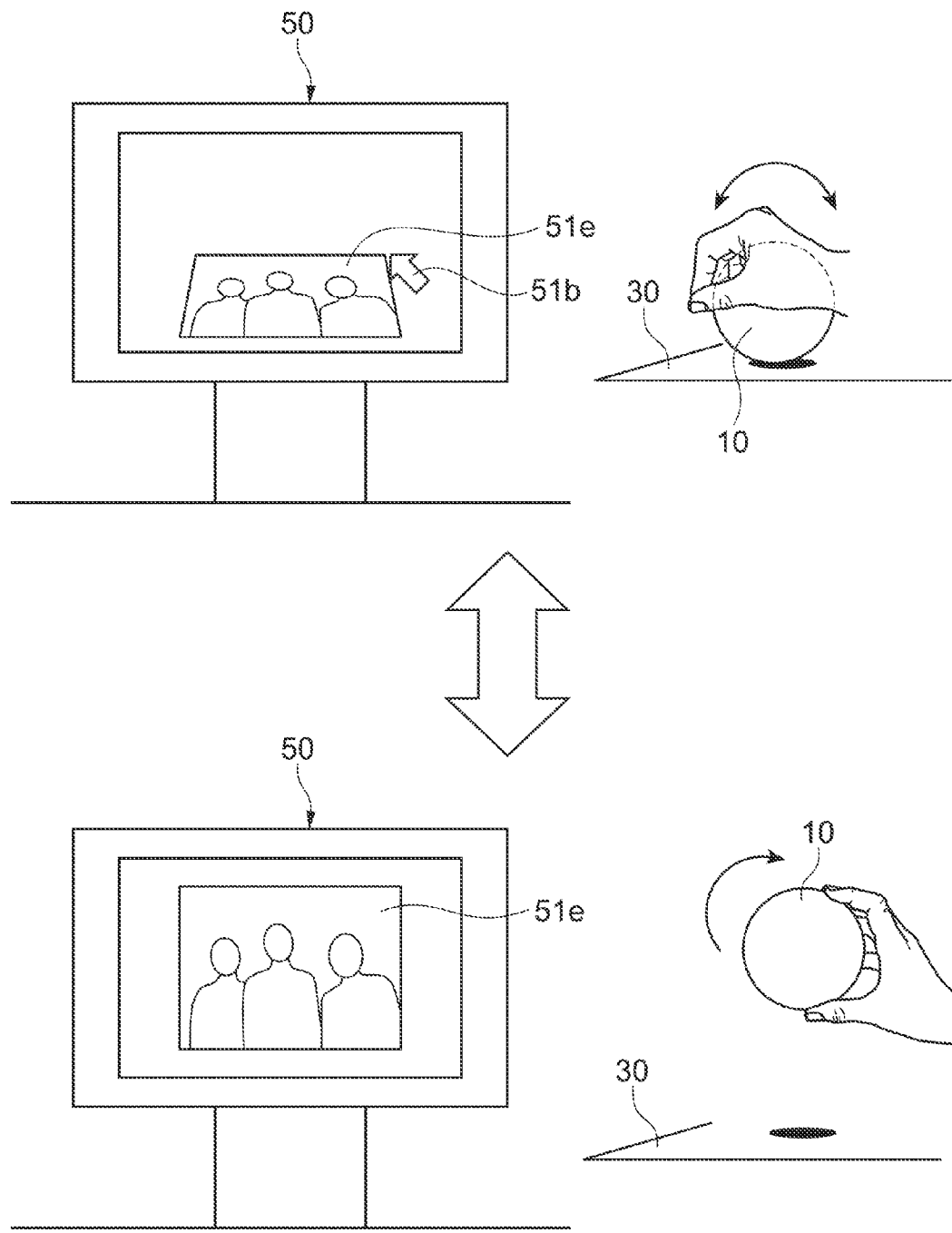
FIG. 18 is a view for explaining a third application example of the information processing system.

FIG. 18 is a view for explaining a third application example of the information processing system.

In the 2D operation shown in the upper part of FIG. 18, the pointer 51b is an operation object image, and the user moves the pointer 51b by moving the operation device 10. When the user selects a fallen photographic image 51e using the pointer 51b, the photographic image 51e becomes the operation object image in turn. In this state, the photographic image 51e is in a state capable of being operated by the 2D operation. Examples of the 2D operation of the photographic image 51e includes, for example, a zoom in, a zoom out, panning, and rotation.

On the other hand, in the 3D operation shown in the lower part of FIG. 18, application software makes it possible to display the selected photographic image 51e such that it is caused to rise according to the motion of the operation device 10. In this case, such a movement of the photographic image 51e is made possible, for example, when the user operates the operation device 10 to be upwardly (positively) rotated toward himself/herself.

For example, in the upper part of FIG. 18, the photographic image 51e is placed on a two-dimensional surface (for example, a desk surface) in a virtual space. In the lower part of FIG. 18, when the photographic image 51e rotates with its lower side as a rotational axis, the photographic image 51e is caused to rise.

Fourth Application Example

Figure 19:
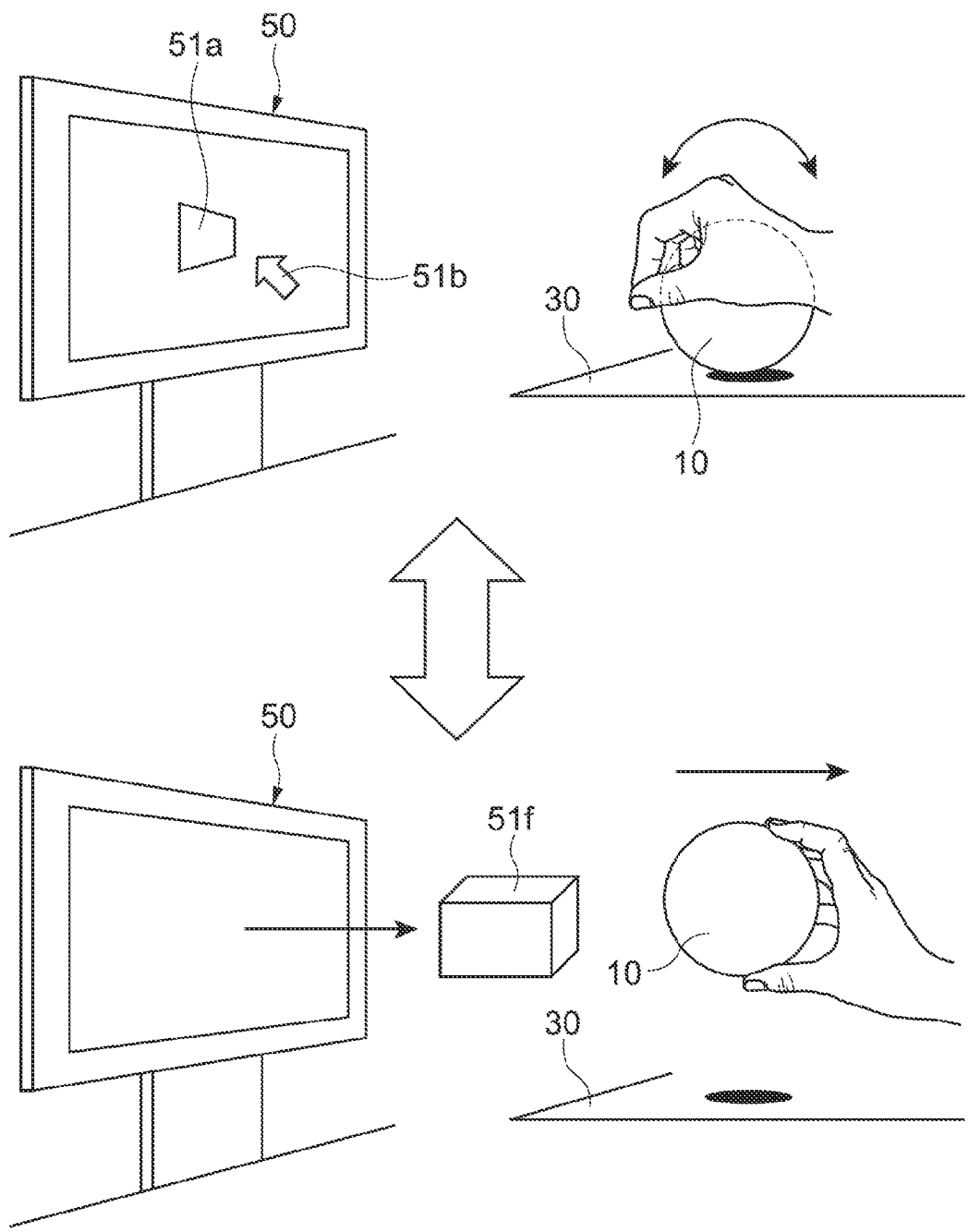
FIG. 19 is a view for explaining a fourth application example of the information processing system.

FIG. 19 is a view for explaining a fourth application example of the information processing system.

The explanation of the 2D operation shown in the upper part of FIG. 19 is the same as that of the 2D operation shown in the upper part of FIG. 16. In the 3D operation shown in the lower part of FIG. 19, a 2D image is still an operation object image when the user only lifts the operation device 10. As shown in the lower part of FIG. 19, the display device 50 generates, when the user pulls the operation device 10 toward himself/herself, a 3D operation object image in such a manner that the 2D operation object image is drawn from the screen. The subsequent operation is the same as the 3D operation shown in the lower part of FIG. 16.

(Another Embodiment of Operation Device)

Figure 20:
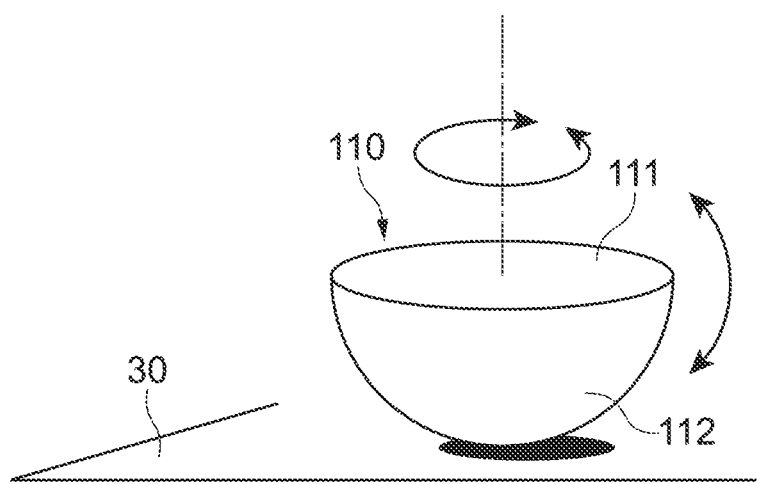
FIG. 20 is a perspective view showing another embodiment of the operation device.

FIG. 20 is a perspective view showing another embodiment of the operation device. In the following description, the same members, functions, or the like as those of the operation device 10 according to the embodiment described above will be simplified or omitted, and only different points will be mainly focused.

An operation device 110 is semispherical in shape and has an upper plane surface 111 and a lower semispherical surface 112 capable of coming in contact with the operation surface 30 in the 2D operation. In the 2D operation, the user operates the operation device 110 with part or all of the upper plane surface 111 coming in contact with the user's palm. The upper plane surface 111 does not come in contact with the operation surface 30, and the operation device 110 acts like a self-righting doll (doll that rights itself when knocked over). The 3D operation is basically the same as that described in the embodiment described above. However, the user typically operates the operation device 110 in a 3D space with part or all of the upper plane surface 111 coming in contact with the user's palm.

Besides the shape described above, the operation device 110 is formed in, for example, an egg shape, a shape formed of about ¾ of a ball shape, an elliptic shape, a polyhedral shape having a curved lower semispherical surface 112, or a shape formed by combining at least two of these shapes together.

Among the operation devices having these shapes other than a ball shape, the operation device having the shape previously specified in its vertical direction may use various known methods other than the calculation method described above as calculation methods for detecting the motion of the operation device. For example, with at least acceleration sensors and angular speed sensors of two different axes, the CPU of the operation device is allowed to detect the motion of the operation device. In the operation device having the shape previously specified in the vertical direction, for example, at least two of the acceleration sensor 5, the angular speed sensor 6, and the magnetic sensor 7 or at least one of the acceleration sensor 5 and the angular speed sensor 6 serves as a motion sensor.

(Input Apparatus)

Figure 21:
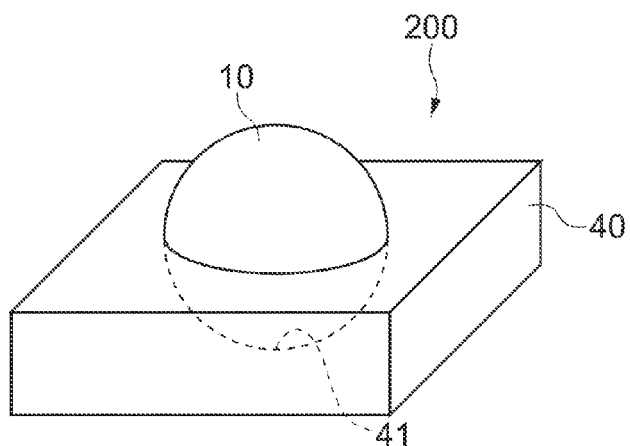
FIG. 21 is a perspective view showing an input apparatus.

Next, an input apparatus 200 will be described as another embodiment of the operation device. FIG. 21 is a perspective view showing the input apparatus 200.

The input apparatus 200 includes a stage 40 (or a cradle) and the operation device 10 mounted on the stage 40 and capable of being removed from the stage 40. A typical operation object of the input apparatus 200 is an image displayed on the display device 50 as described above.

Here, the operation device 10 basically has the same shape, structure, and functions as those of the operation device 10 described above. The stage 40 has an operation surface 41 formed in a shape corresponding to the shape of the front surface of the operation device 10, and the operation surface 41 is, for example, semispherical in shape. The operation device 10 is mounted on the stage 40 in a state of coming in contact with the semispherical operation surface 41.

(Method of Operating Input Apparatus)

First Example

Figure 22:
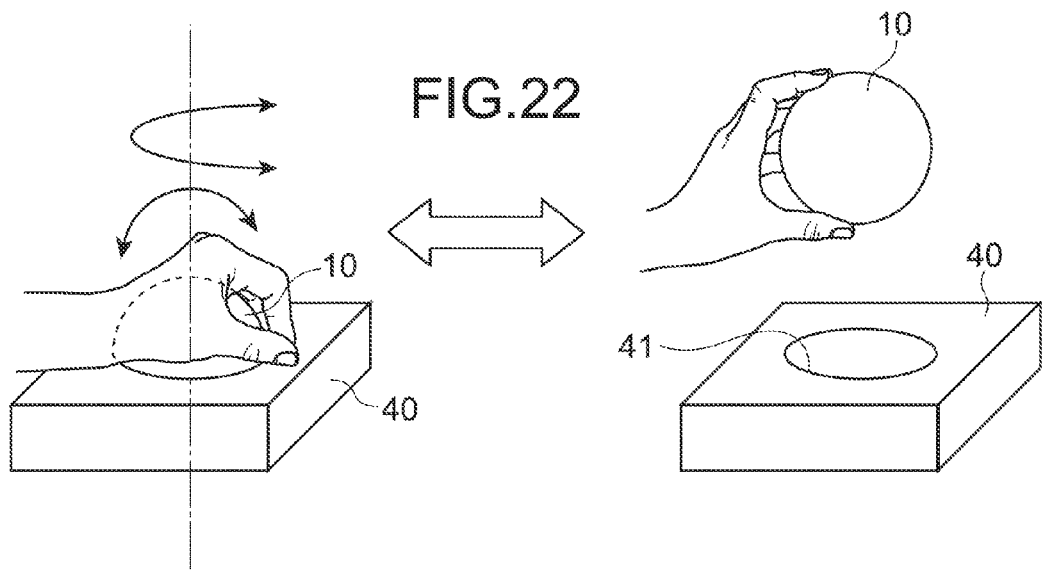
FIG. 22 is a view for explaining a method of operating the input apparatus.

FIG. 22 is a view for explaining a method of operating the input apparatus 200.

In the 2D operation, as shown in the left part of FIG. 22, the user rotates the operation device 10 on the stage 40 in any direction. That is, in the 2D operation, the user operates the input apparatus 200 in such a manner as to operate a trackball. In the 3D operation, as shown in the right part of FIG. 22, the user lifts the operation device 10 from the stage 40 and operates the same.

The determination processing for determining the 2D/3D operation is performed in the same manner as the above, but may be performed by sensors provided in the stage 40 as described below. Further, examples of the operation objects and the operation methods of the input apparatus 200 include the application examples shown in FIGS. 16 to 19. These operation objects and the operation methods are also applied to the following second example.

Second Example

Figure 23:
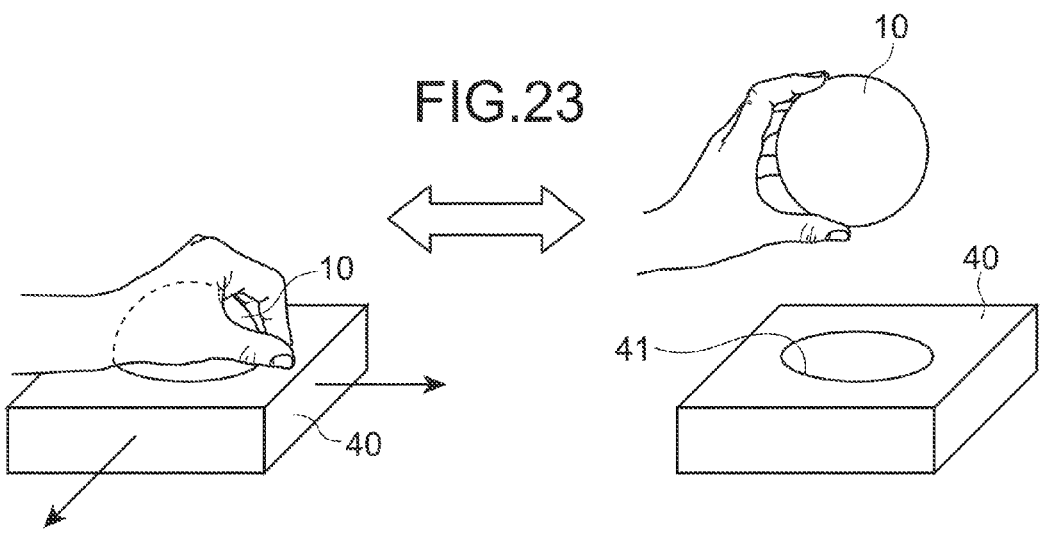
FIG. 23 is a view for explaining another method of operating the input apparatus.

FIG. 23 is a view for explaining another method of operating the input apparatus 200.

In the 2D operation, as shown in the left part of FIG. 23, the user holds the operation device 10 and moves the operation device 10 and the stage 40 on a plane in an integrated manner. In other words, the user performs this operation as in the case of operating a mouse on an X-Y plane. In this case, the stage 40 includes a sensor (not shown) such as an optical sensor, an acceleration sensor, or a trackball sensor capable of detecting the translating motion of the stage 40 on the plane. In the 3D operation, as shown in the right part of FIG. 23, the user lifts the operation device 10 from the stage 40 and operates the same.

When the determination processing for determining the 2D/3D operation described above determines that the user is now performing the 2D operation, the motion detection of the operation device 10 becomes inactive and the motion detection of the stage 40 becomes active. The operation device 10 and the stage 40 may be in direct communication with each other to determine which of the operation device 10 and the stage 40 is responsible for performing the detection to switch between the 2D operation and the 3D operation. Alternatively, the operation device 10 and the stage 40 may be in communication with each other via an apparatus such as a server other than the display device 50 described above.

(Determination Processing for Determining 2D/3D Operation with Input Apparatus)

The determination processing for determining the 2D/3D operation with the input apparatus 200 may be performed by the various sensors provided in the stage 40 as described below. In this case, the stage 40 typically includes a CPU and a memory besides these sensors, and the CPU may perform the determination processing for determining the 2D/3D operation.

(Pressure Sensors)

One or more pressure sensors are provided in the operation surface 41 of the stage 40. When the pressure sensors detect a pressure force generated by at least the weight of the operation device 10, it is determined that the user is now performing the 2D operation. Otherwise, it is determined that the user is now performing the 3D operation.

(Magnetic Sensors)

One or more magnetic sensors provided in the stage 40 detect a magnetic substance in the operation device 10. When magnetic intensity detected by the magnetic sensors exceeds a threshold, it is determined that the user is now performing the 2D operation. When the magnetic intensity is less than or equal to the threshold, it is determined that the user is now performing the 3D operation.

(Capacitance Sensors)

One or more capacitance sensors are provided in the operation surface 41 of the stage 40. The detection value of the capacitance sensors is different depending on whether the operation device 10 is mounted on the stage 40. Thus, it is made possible for the capacitance sensors to perform the determination processing for determining the 2D/3D operation.

(Optical Sensors)

One or more reflection type optical sensors are, for example, provided in the operation surface 41 of the stage 40. The light receiving amount of the reflection type optical sensors is different depending on whether the operation device 10 is mounted on the stage 40. Thus, it is made possible for the reflection type optical sensors to perform the determination processing for determining the 2D/3D operation.

Further, transmission type optical sensors, each having a light receiving unit and a light emitting unit and arranged at two parts of the operation surface 41, are allowed to perform the determination processing for determining the 2D/3D operation.

(Ultrasonic Sensors)

One or more reflection type ultrasonic sensors are, for example, provided in the operation surface 41 of the stage 40. In the 2D operation, because emitted ultrasonic waves are bounced from the operation device 10, the ultrasonic sensors detect the bounced ultrasonic waves. However, in the 3D operation, the ultrasonic sensors do not detect the bounced ultrasonic waves. Thus, it is made possible for reflection type ultrasonic sensors to perform the determination processing for determining the 2D/3D operation.

Further, transmission type optical sensors, each having a transmission unit and a receiving unit for ultrasonic waves and arranged at two parts of the operation surface 41, are allowed to perform the determination processing for determining the 2D/3D operation.

(Distortion Sensors)

One or more distortion sensors are, for example, provided in the operation surface 41 of the stage 40. When the operation device 10 is mounted on the stage 40, the distortion sensors detect distortion in the operation surface 41 by an amount corresponding to the weight of the operation device 10. However, in the 3D operation, the distortion sensors do not detect such distortion. Thus, it is made possible for distortion sensors to perform the determination processing for determining the 2D/3D operation.

If each of the sensors described above has low precision, detection with at least two of the sensors may be used in combination to perform the determination processing for determining the 2D/3D operation. As a result, an improvement in the precision of the determination processing is made possible. Alternatively, at least one of the sensors provided in the stage 40 and at least one of the sensors provided in the operation device 10 may be used in combination to perform the determination processing for determining the 2D/3D operation. As a result, an improvement in the precision of the determination processing is made possible.

(Other Embodiments)

The present disclosure is not limited to the embodiment described above, and other various embodiments are implemented.

The operation object image described above may not be limited to an object that moves corresponding to the motion of the operation device. For example, the operation object image may be an image displayed for switching of the channels, adjustment of the volume, or the like of a TV. In this case, the display device 50 generates the image such that the image changes at the switching and the adjustment corresponding to the operation of the operation device 10.

In the stage 40 of the input apparatus 200 shown in FIG. 21, a sensor capable of detecting rotation about a Z axis (axis perpendicular to the X-Y operation plane in the 2D operation shown in FIG. 23), such as an angular speed sensor, may be provided.

The operation devices according to the embodiments described above have the curved outer surface that comes in contact with the operation surface. However, the outer surface is not limited to the curved surface. For example, the operation devices may have a plane surface or a combined surface of the plane surface and the curved surface.

Among the features of the embodiments described above, at least two of the features may be combined together.

Note that the present disclosure may also employ the following configurations.

(1) An information processing apparatus for processing information obtained from an operation device having a motion sensor capable of detecting translating and rotating motion of the operation device, the apparatus including:
 a calculation unit having
  a two-dimensional calculation mode configured to perform, when the operation device is placed on an operation surface and a user operates the operation device with a curved outer surface of the operation device come in contact with the operation surface, calculation based on a detection value of the motion sensor corresponding to two-dimensional motion of the operation device, and
  a three-dimensional calculation mode configured to perform, when the user operates the operation device in a three-dimensional space, calculation based on a detection value of the motion sensor corresponding to three-dimensional motion of the operation device; and
 a determination unit configured to determine which of the two-dimensional calculation mode and the three-dimensional calculation mode is used to perform the calculation with the calculation unit, based on the detection value of the motion sensor and at least one of information other than the detection value of the motion sensor.

(2) The information processing apparatus according to (1), in which
 the calculation unit is configured to perform the calculation, using, as the two-dimensional calculation mode, a calculation mode when the user operates the operation device with the curved outer surface of the operation device coming in contact with the operation surface.

(3) The information processing apparatus according to (2), in which
 the operation device has a front surface including the outer surface and a pressure sensor configured to detect a force applied to the front surface, and
 the determination unit is configured to acquire a detection value of the pressure sensor as the other information.

(4) The information processing apparatus according to (3), in which
 the determination unit is configured
  to determine that the calculation unit performs the calculation under the two-dimensional calculation mode when the pressure sensor detects an application of a force greater than or equal to a pressure force by the operation device to the front surface, and
  to determine that the calculation unit performs the calculation under the three-dimensional calculation mode when the pressure sensor does not detect the application of the force greater than or equal to the pressure force by the operation device to the front surface.

(5) The information processing apparatus according to any one of (1) to (4), in which the determination unit is configured
to determine that the calculation unit performs the calculation under the three-dimensional calculation mode when the detection value of the motion sensor includes a hand shake component of the user, and
to determine that the calculation unit performs the calculation under the two-dimensional calculation mode when the detection value of the motion sensor does not include the hand shake component of the user.

(6) The information processing apparatus according to any one of (1) to (5), in which
the determination unit is configured to acquire, as the other information, a detection value of one of a capacitance sensor, an air pressure sensor, an optical sensor, an ultrasonic sensor, and a distortion sensor.

(7) The information processing apparatus according to any one of (1) to (5), in which
the determination unit is configured to acquire, as the other information, a detection value of a sensor provided in a stage including the operation surface having a shape corresponding to the outer surface of the operation device.

(8) The information processing apparatus according to (1), further including
a storage unit configured to store application software for switching between the two-dimensional calculation mode and the three-dimensional calculation mode depending on an input operation of the user.

(9) The information processing apparatus according to any one of (1) to (8), in which
the operation device is an operation device
including an acceleration sensor, an angular speed sensor, and a magnetic sensor each having three orthogonal detection axes in a local coordinate system and
capable of being operated by the user in any position in the three-dimensional space, and
the calculation unit is configured to implement the two-dimensional calculation mode with
an acquisition unit configured to acquire information on acceleration, angular speeds, and magnetic intensity detected by the acceleration sensor, the angular speed sensor, and the magnetic sensor, respectively,
a coordinate conversion unit configured to convert, using information on posture angles of the operation device in a global coordinate system representing the three-dimensional space, the angular speeds acquired by the acquisition unit into global angular speeds in the global coordinate system,
an initial posture angle calculation unit configured to calculate initial posture angles of the operation device in the global coordinate system as the posture angles based on the information on the acceleration and the magnetic intensity acquired by the acquisition unit when the user starts operating the operation device,
an update unit configured to update the posture angles of the operation device in the global coordinate system based on information on the global angular speeds converted by the coordinate conversion unit, and
a control unit configured
to cause the coordinate conversion unit to convert, using information on the initial posture angles calculated by the initial posture angle calculation unit, first angular speeds as the angular speeds acquired by the acquisition unit when the user starts operating the operation device into the global angular speeds, and
to cause the coordinate conversion unit to convert, using information on the updated posture angles, second angular speeds acquired after the first angular speeds into the global angular speeds.

(10) The information processing apparatus according to (9), in which
the calculation unit is configured to implement the three-dimensional calculation mode in such a manner that the coordinate conversion unit converts the acceleration acquired by the acquisition unit into global acceleration in the global coordinate system based on the information on the posture angles of the operation device updated by the update unit.

(11) The information processing apparatus according to any one of (1) to (10), in which
the operation device is spherical in outer shape.

(12) The information processing apparatus according to any one of (1) to (11), in which
the calculation unit is configured
to generate, in the two-dimensional calculation mode, information for moving a first operation object image on a screen according to the motion of the operation device, the first operation object image being displayed on the screen, and
to generate, in the three-dimensional calculation mode, information for moving a second operation object image on the screen according to the motion of the operation device, the second operation object image being displayed on the screen and different from the first operation object image.

(13) The information processing apparatus according to (12), in which
the calculation unit is configured to generate, in the three-dimensional calculation mode, the information for moving the second operation object image, the second operation object image being a three-dimensional image formed by a plurality of images including parallax.

(14) The information processing apparatus according to (12), further including
an image storage unit configured to store the second operation object image as an image associated with a predetermined coordinate position on the screen of the first operation object image.

(15) The information processing apparatus according to any one of (1) to (11), in which
the calculation unit is configured to generate, in the two-dimensional calculation mode, a pointer image for selecting an image to be displayed on the screen according to the motion of the operation device created when the user performs an input operation on the operation device.

(16) The information processing apparatus according to (15), in which
the calculation unit is configured to generate, in the three-dimensional calculation mode, information for moving the image selected by the pointer image on the screen according to the motion of the operation device.

(17) An information processing method for processing information obtained from an operation device having a motion sensor capable of detecting translating and rotating motion of the operation device, the method including:
performing, when the operation device is placed on an operation surface and a user operates the operation device, first calculation based on a detection value of the motion sensor corresponding to two-dimensional motion of the operation device;
performing, when the user operates the operation device in a three-dimensional space, second calculation based on a detection value of the motion sensor corresponding to three-dimensional motion of the operation device; and determining which of the first calculation and the second calculation is performed based on the detection value of the motion sensor and at least one of information other than the detection value of the motion sensor.

(18) An input apparatus, including:
a stage having an operation surface; and
an operation device having
an outer surface coming in contact with the operation surface when the operation device is placed on the operation surface and
a motion sensor capable of detecting translating and rotating motion of the operation device,
the operation device being capable of being removed from the stage.

(19) The input apparatus according to (18), in which
the stage has the operation surface formed in a shape corresponding to a shape of the outer surface of the operation device.

(20) The input apparatus according to (18) or (19), in which
the stage has a sensor capable of detecting at least translating motion of the stage.

(21) The input apparatus according to any one of (18) to (20), in which
the operation device is spherical in the outer shape.

The present disclosure contains subject matter related to that disclosed in Japanese Priority Patent Application JP 2011-161797 filed in the Japan Patent Office on Jul. 25, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for processing information obtained from an operation device having a motion sensor capable of detecting translating and rotating motion of the operation device, the apparatus comprising:
a calculation unit having
a two-dimensional calculation mode configured to perform, when the operation device is placed on an operation surface and a user operates the operation device, calculation based on a detection value of the motion sensor corresponding to two-dimensional motion of the operation device, and
a three-dimensional calculation mode configured to perform, when the user operates the operation device in a three-dimensional space, calculation based on a detection value of the motion sensor corresponding to three-dimensional motion of the operation device; and
a determination unit configured to determine which of the two-dimensional calculation mode and the three-dimensional calculation mode is used to perform the calculation with the calculation unit, based on the detection value of the motion sensor and at least one of information other than the detection value of the motion sensor; wherein
the operation device is an operation device
including an acceleration sensor, an angular speed sensor, and a magnetic sensor each having three orthogonal detection axes in a local coordinate system and capable of being operated by the user in any position in the three-dimensional space, and
the calculation unit is configured to implement the two-dimensional calculation mode with an acquisition unit configured to acquire information on acceleration, angular speeds, and magnetic intensity detected by the acceleration sensor, the angular speed sensor, and the magnetic sensor, respectively,
a coordinate conversion unit configured to convert, using information on posture angles of the operation device in a global coordinate system representing the three-dimensional space, the angular speeds acquired by the acquisition unit into global angular speeds in the global coordinate system,
an initial posture angle calculation unit configured to calculate initial posture angles of the operation device in the global coordinate system as the posture angles based on the information on the acceleration and the magnetic intensity acquired by the acquisition unit when the user starts operating the operation device,
an update unit configured to update the posture angles of the operation device in the global coordinate system based on information on the global angular speeds converted by the coordinate conversion unit, and
a control unit configured
to cause the coordinate conversion unit to convert, using information on the initial posture angles calculated by the initial posture angle calculation unit, first angular speeds as the angular speeds acquired by the acquisition unit when the user starts operating the operation device into the global angular speeds, and
to cause the coordinate conversion unit to convert, using information on the updated posture angles, second angular speeds acquired after the first angular speeds into the global angular speeds.

2. The information processing apparatus according to claim 1, wherein
the calculation unit is configured to perform the calculation, using, as the two-dimensional calculation mode, a calculation mode when the user operates the operation device with a curved outer surface of the operation device coming in contact with the operation surface.

3. The information processing apparatus according to claim 2, wherein
the operation device has a front surface including the outer surface and a pressure sensor configured to detect a force applied to the front surface, and
the determination unit is configured to acquire a detection value of the pressure sensor as the other information.

4. The information processing apparatus according to claim 1, wherein
the determination unit is configured
to determine that the calculation unit performs the calculation under the three-dimensional calculation mode when the detection value of the motion sensor includes a hand shake component of the user, and
to determine that the calculation unit performs the calculation under the two-dimensional calculation mode when the detection value of the motion sensor does not include the hand shake component of the user.

5. The information processing apparatus according to claim 1, wherein
the determination unit is configured to acquire, as the other information, a detection value of one of a capacitance sensor, an air pressure sensor, an optical sensor, an ultrasonic sensor, and a distortion sensor.

6. The information processing apparatus according to claim 1, wherein
the determination unit is configured to acquire, as the other information, a detection value of a sensor provided in a stage including the operation surface having a shape corresponding to the outer surface of the operation device.

7. The information processing apparatus according to claim 1, further comprising
a storage unit configured to store application software for switching between the two-dimensional calculation mode and the three-dimensional calculation mode depending on an input operation of the user.

8. The information processing apparatus according to claim 1, wherein
the calculation unit is configured to implement the three-dimensional calculation mode in such a manner that the coordinate conversion unit converts the acceleration acquired by the acquisition unit into global acceleration in the global coordinate system based on the information on the posture angles of the operation device updated by the update unit.

9. The information processing apparatus according to claim 1, wherein
the operation device is spherical in outer shape.

10. The information processing apparatus according to claim 1, wherein
the calculation unit is configured
to generate, in the two-dimensional calculation mode, information for moving a first operation object image on a screen according to the motion of the operation device, the first operation object image being displayed on the screen, and
to generate, in the three-dimensional calculation mode, information for moving a second operation object image on the screen according to the motion of the operation device, the second operation object image being displayed on the screen and different from the first operation object image.

11. The information processing apparatus according to claim 10, wherein
the calculation unit is configured to generate, in the three-dimensional calculation mode, the information for moving the second operation object image, the second operation object image being a three-dimensional image formed by a plurality of images including parallax.

12. The information processing apparatus according to claim 10, further comprising
an image storage unit configured to store the second operation object image as an image associated with a predetermined coordinate position on the screen of the first operation object image.

13. The information processing apparatus according to claim 1, wherein
the calculation unit is configured to generate, in the two-dimensional calculation mode, a pointer image for selecting an image to be displayed on the screen according to the motion of the operation device created when the user performs an input operation on the operation device.

14. The information processing apparatus according to claim 13, wherein
the calculation unit is configured to generate, in the three-dimensional calculation mode, information for moving the image selected by the pointer image on the screen according to the motion of the operation device.

15. An information processing apparatus for processing information obtained from an operation device having a motion sensor capable of detecting translating and rotating motion of the operation device, the apparatus comprising:
a calculation unit having
a two-dimensional calculation mode configured to perform, when the operation device is placed on an operation surface and a user operates the operation device, calculation based on a detection value of the motion sensor corresponding to two-dimensional motion of the operation device, and
a three-dimensional calculation mode configured to perform, when the user operates the operation device in a three-dimensional space, calculation based on a detection value of the motion sensor corresponding to three-dimensional motion of the operation device; and
a determination unit configured to determine which of the two-dimensional calculation mode and the three-dimensional calculation mode is used to perform the calculation with the calculation unit, based on the detection value of the motion sensor and at least one of information other than the detection value of the motion sensor;
wherein the calculation unit is configured to perform the calculation, using, as the two-dimensional calculation mode, a calculation mode when the user operates the operation device with a curved outer surface of the operation device coming in contact with the operation surface
wherein
the operation device has a front surface including the outer surface and a pressure sensor configured to detect a force applied to the front surface, and
the determination unit is configured to acquire a detection value of the pressure sensor as the other information,
wherein
the determination unit is configured
to determine that the calculation unit performs the calculation under the two-dimensional calculation mode when the pressure sensor detects an application of a force greater than or equal to a pressure force by the operation device to the front surface, and
to determine that the calculation unit performs the calculation under the three-dimensional calculation mode when the pressure sensor does not detect the application of the force greater than or equal to the pressure force by the operation device to the front surface.

* * * * *